US011995087B2

(12) United States Patent
Lee et al.

(10) Patent No.: US 11,995,087 B2
(45) Date of Patent: May 28, 2024

(54) NEAR-MEMORY ACCELERATION FOR DATABASE OPERATIONS

(71) Applicant: SAP SE, Walldorf (DE)

(72) Inventors: Dong Hun Lee, Seoul (KR); Minseon Ahn, Hwaseong (KR); Jungmin Kim, Yongin (KR); Kang Woo Choi, Seoul (KR); Oliver Rebholz, Siebeldingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/095,936

(22) Filed: Jan. 11, 2023

(65) Prior Publication Data

US 2023/0161771 A1    May 25, 2023

Related U.S. Application Data

(63) Continuation of application No. 16/897,138, filed on Jun. 9, 2020, now Pat. No. 11,586,630.

(60) Provisional application No. 62/982,683, filed on Feb. 27, 2020.

(51) Int. Cl.
*G06F 16/2455* (2019.01)
*G06F 9/30* (2018.01)
*G06F 9/54* (2006.01)
*G06F 12/06* (2006.01)
*G06F 16/21* (2019.01)
(Continued)

(52) U.S. Cl.
CPC .... *G06F 16/24561* (2019.01); *G06F 9/30036* (2013.01); *G06F 9/542* (2013.01); *G06F 9/544* (2013.01); *G06F 12/063* (2013.01);

*G06F 16/211* (2019.01); *G06F 16/2282* (2019.01); *G06F 16/24569* (2019.01)

(58) Field of Classification Search
CPC .................................. G06F 16/24569
See application file for complete search history.

(56) References Cited

U.S. PATENT DOCUMENTS

2015/0261860 A1    9/2015  Mittal et al.
2016/0012107 A1    1/2016  Asaad et al.
2017/0139836 A1    5/2017  Dittmann
(Continued)

OTHER PUBLICATIONS

MichaelS., "Offloading Application Segments to Intel Xeon Phi Coprocessors," insideHPC, insidehpc.com, Jul. 21, 2016, 3 pages.
(Continued)

*Primary Examiner* — William Spieler
(74) *Attorney, Agent, or Firm* — Klarquist Sparkman, LLP

(57) ABSTRACT

Despite the increase of memory capacity and CPU computing power, memory performance remains the bottleneck of in-memory database management systems due to ever-increasing data volumes and application demands. Because the scale of data workloads has out-paced traditional CPU caches and memory bandwidth, one can improve data movement from memory to computing units to improve performance in in-memory database scenarios. A near-memory database accelerator framework offloads data-intensive database operations via or to a near-memory computation engine. The database accelerator's system architecture can include a database accelerator software module/driver and a memory module with a database accelerator engine. An application programming interface (API) can be provided to support database accelerator functionality. Memory of the database accelerator can be directly accessible by the CPU.

20 Claims, 34 Drawing Sheets

(51) Int. Cl.
  G06F 16/22 (2019.01)
  G06F 16/245 (2019.01)

(56) References Cited

U.S. PATENT DOCUMENTS

| | | | |
|---|---|---|---|
| 2018/0284992 | A1 | 10/2018 | Haller et al. |
| 2019/0034493 | A1 | 1/2019 | Gopal et al. |
| 2019/0212918 | A1 | 7/2019 | Wang et al. |
| 2021/0271680 | A1 | 9/2021 | Lee et al. |

OTHER PUBLICATIONS

Lai et al., "Apache HBase: Coprocessor Introduction," blogs.apache.org, Feb. 1, 2012, 8 pages.

Singh et al., "Near-Memory Computing: Past, Present, and Future," arXiv:1908:02640v1, Aug. 7, 2019, 16 pages.

Xi et al., "Beyond the Wall: Near-Data Processing for Databases," Harvard University, DaMoN '15 (ACM), dx.doi.org/10.1145/2771937.2771945, Jun. 1, 2015, 10 pages.

Mehta, "Pushing Performance and Integration with the UltraScale+ Portfolio," WP471, xlinix.com/support/documentation, Nov. 24, 2015, 10 pages.

Jo et al., "YourSQL: A High-Performance Database System Leveraging In-Storage Computing," Proc. VLDB Endowment, 9(12), Aug. 2016, pp. 924-935, 12 pages.

Lee et al., "Optimizing Data Movement with Near-Memory Acceleration of In-memory DBMS," open proceedings, *Proceedings of the 23$^{rd}$ International Conference on Extending Database Technology (EDBT)*, Mar. 30-Apr. 2, 2020, Copenhagen, Denmark, pp. 371-374, 4 pages.

Extended European Search Report for counterpart European Application No. 20197823.6 dated Mar. 12, 2021, 8 pages.

Fang et al., "In-Memory Database Acceleration on FPGAs: A Survey," VLDB Journal, Springer Verlag, Berlin DE, vol. 29, No. 1, Oct. 26, 2019, pp. 33-59.

Lee et al., "Optimizing Data Movement with Near-Memory Acceleration of in-memory DBMS," (2020) in EDBT, pp. 371-374.

Augusta et al., "JAFAR: Near-data processing for databases," in Proceedings of the 2015 ACM SIGMOD International Conference on Management of Data (2015) pp. 2069-2070.

Yitbarek et al., "Exploring specialized near-memory processing for data intensive operations," in 2016 Design, Automation & Test in Europe Conference & Exhibition (2016) pp. 1449-1452.

Mutlu et al., "Enabling practical processing in and near memory for data-intensive computing," in Proceedings of the 56$^{th}$ Annual Design Automation Conference (2019) pp. 1-4, 4 pages.

Ghadge et al., "Building a RESTFul API Using Node JS and MongoDB," Sep. 25, 2019, 10 pages.

FIG. 27

Example #2

| 0 | 1 | 2 | 3 | 4 | 5 | 0 | 1 | 2 | 3 |
|---|---|---|---|---|---|---|---|---|---|
| 2 | 126 | 576 | 55 | 317 | 265 | 126 | 576 | 55 | *390* |

| 0 | 1 | 2 | 3 | 4 | 5 | 6 |
|---|---|---|---|---|---|---|
| 2 | 126 | 576 | 55 | 317 | 265 | *390* |

Example #1

| 0 | 1 | 2 | 3 | 4 | 5 | 0 | 1 | 2 | 3 | 4 |
|---|---|---|---|---|---|---|---|---|---|---|
| 2 | 126 | 576 | 55 | 317 | 265 | 126 | 576 | 55 | 317 | *80* |

| 0 | 1 | 2 | 3 | 4 | 5 | 6 |
|---|---|---|---|---|---|---|
| 2 | 126 | 576 | 55 | 317 | 265 | *80* |

2700

NEAR-MEMORY ACCELERATION FOR DATABASE OPERATIONS

CROSS-REFERENCE TO RELATED APPLICATIONS

This application is a continuation of U.S. patent application Ser. No. 16/897,138, filed on Jun. 9, 2020, and claims the benefit of U.S. Provisional Application No. 62/982,683, filed on Feb. 27, 2020, both of which are hereby incorporated by reference herein.

BACKGROUND

The increasing scale of data processing workloads continues to challenge the performance of in-memory database management systems, despite increases in memory capacity and CPU computing power. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An embodiment comprises a method comprising, in an in-memory database management system environment, receiving a request to perform a database operation on a plurality of values represented in source data, wherein the source data is stored in device memory of a near-memory database accelerator; offloading the database operation to the near-memory database accelerator; and receiving, from the near-memory database accelerator, an indication that results of the database operation are available.

Another embodiment comprises a system comprising one or more processing units; main memory or extended memory directly accessible by the one or more processing units; and a near-memory database accelerator driver configured to receive a request to perform a database operation on source data stored in device memory of a near-memory database accelerator comprising at least one database accelerator engine separate from the one or more processing units, offload the database operation to the near-memory database accelerator for execution by the at least one database accelerator engine separate from the one or more processing units, and receive an indication from the near-memory database accelerator that results of the database operation are available; wherein the main memory or extended memory comprises the device memory of the near-memory database accelerator.

Another embodiment comprises one or more computer-readable media comprising computer-executable instructions that when executed cause a computing system to perform a method comprising: receiving, from an in-memory database management system, an application programming interface (API) call requesting that a database operation be offloaded to a near-memory database accelerator, wherein the database operation is performed on an in-memory column of a database table that is compressed according to bit-packed compression format, and the API call specifies a number-of-bits parameter; responsive to the API call, sending a request to a near-memory database accelerator, wherein the sending comprises relaying the number-of-bits parameter and the near-memory database accelerator performs the database operation with the number-of-bits parameter; receiving an indication from the near-memory database accelerator that the database operation has completed; and notifying the in-memory database management system that the database operation has completed.

The foregoing and other objects, features, and advantages will become more apparent from the following detailed description, which proceeds with reference to the accompanying figures.

BRIEF DESCRIPTION OF THE DRAWINGS

FIG. 27 is a block diagram of cluster dictionary processing in indirect compression for use in an in-memory database management system.

DETAILED DESCRIPTION

Example 1

Overview

Figure 1:
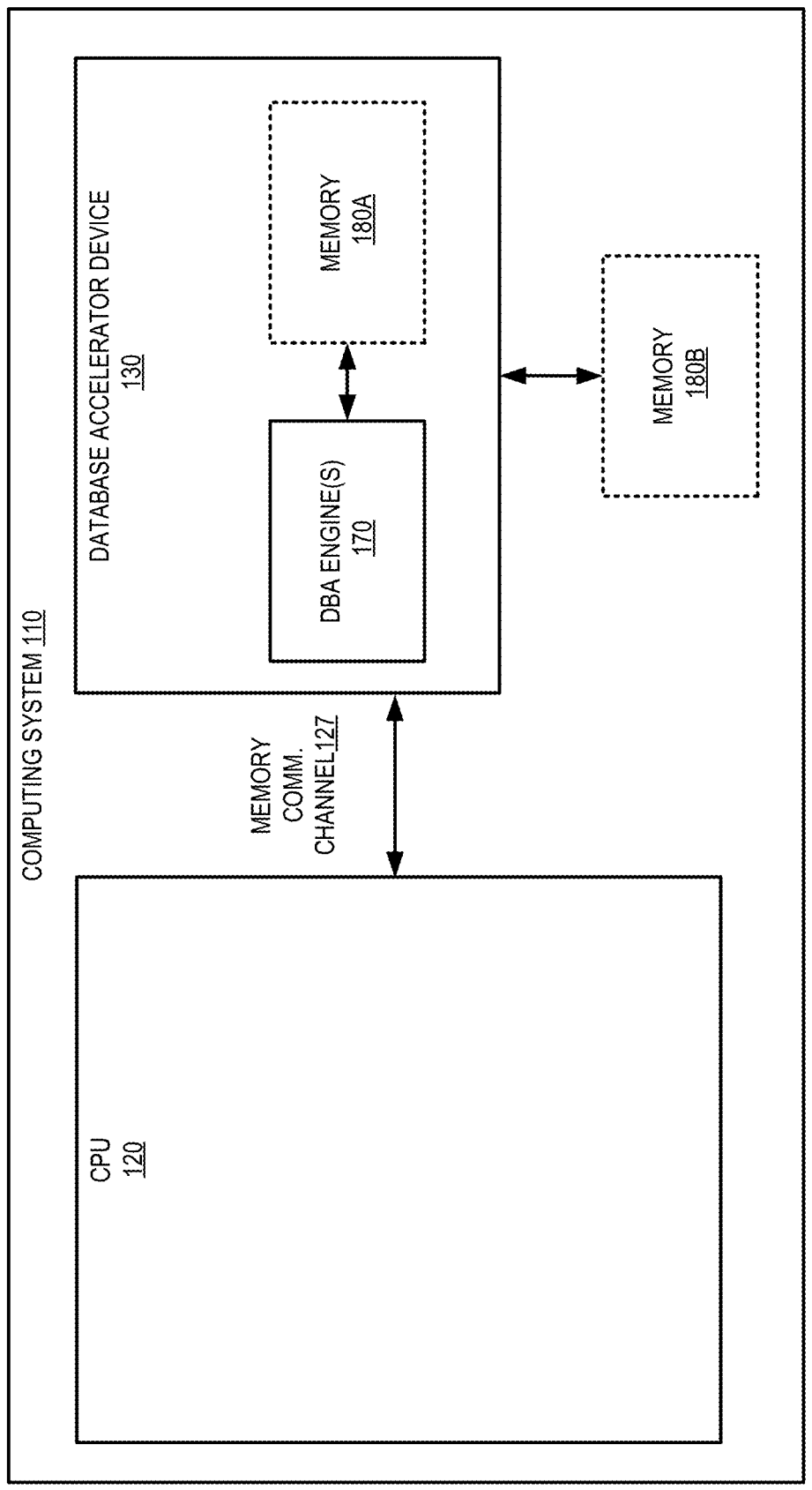
FIG. 1 is a block diagram of an example hardware environment in which near-memory acceleration for database operations can be implemented.

Low cost, high capacity DRAM has accelerated the market of in-memory database management systems (IMDBMSs). The latest IMDBMS architecture capable of running both Online Transactional Processing (OLTP) and Online Analytical Processing (OLAP) applications in a single system removes data redundancy and provides higher performance and efficiency with less total cost ownership (TCO). However, with ever-increasing data volumes and application demands, memory performance becomes the main performance bottleneck of IMDBMSs.

Study of OLTP/OLAP applications reveals that performance can be bound by expensive data-intensive operations like table scan and aggregation of OLAP workloads. Such data-intensive operations have very little data reuse for further computation but consume more than 50% of CPU resources and almost all memory bandwidth in many cases. Other mission critical workloads suffer from cache conflicts (or cache thrashing) and a memory bandwidth bottleneck. Therefore, there is an opportunity to better handle data movement from memory to computing units.

A way to improve such data movement in IMDBMSs would be to process such data-intensive operations within memory devices. Instead of transferring all the data to computing units, forwarding the filtered results to the next processing step could minimize overhead. Near-storage computing tries to accelerate data-intensive operations by minimizing the data transfer overhead between storage and processing nodes (e.g., the CPU).

However, near-storage computing has failed to deliver byte addressability and significantly lower latency for IMDBMSs. Previous work to accelerate database operations using FPGA and GPGPU technologies shows a ten-time performance gain in compute-intensive operations. However, such approaches show a smaller gain in data-intensive operations because of data movement overhead. Even Hybrid CPU-FPGA approaches involve data movement from host memory to accelerator computing units, which has a high memory bandwidth overhead.

Processing-In-Memory (PIM) approaches like UPMEM are an advanced concept of near-memory computing, but they are still in early stage. Furthermore, the data is reformatted to utilize the processing units, thus the existing data structure is not reused directly.

A near-memory database accelerator (DBA) can offload data-intensive operations of an IMDBMS to memory devices. By placing simple arithmetic units near DRAM within memory devices like DIMMs, one can 1) save CPU cycles for data-intensive operations, 2) avoid cache thrashing among threads, and 3) reduce the host memory bottleneck. As described herein, a proof-of-concept (PoC) system can be implemented using FPGAs with attached DIMMs. A DBA kernel is designed to perform parallel comparisons in a SIMD manner fully utilizing internal memory bandwidth. Evaluation shows that a near-memory database accelerator has more than two times performance improvement in OLTP workloads when offloading data-intensive operations. Various obstacles can be overcome to embody the approach in memory devices, enabling widespread adoption of the technologies.

As described herein, database operations can be offloaded to a near-memory database accelerator. As a result, the bandwidth of the CPU-to-memory data path can be relieved for other processing, resulting in overall better performance in an in-memory database management system environment.

Example 2

Example Database Accelerator Hardware Environment

A database accelerator hardware environment can support near-memory acceleration for database operations as described herein. FIG. 1 is a block diagram of an example database accelerator hardware environment 100 that can be used to implement near-memory acceleration for database operations in any of the examples herein. In the example, a computing system 110 comprises a central processing node 120 and one or more database accelerator devices 130.

The central processing node 120 can communicate with the database accelerator device 130 over a memory communication channel 127 such as a bus, CPU-to-memory interconnect, a byte-addressable memory interface, PCI, PCIe, DDR memory interface (e.g., DDR4), Compute Express Link (CXL) memory interface, Gen-Z, and Open-CAPI or the like. Different types of communication channels, including those supporting memory-mapped I/O are possible as described herein. As described herein, the memory communication channel 127 can be used to both communicate with the one or more database accelerator engines 170 and directly access memory 180A or 180B (e.g., wherein such access bypasses the database accelerator engines 170. Although not shown, a memory controller can also be included (e.g., whether in front of or behind the database accelerator engines 170 from the perspective of the central processing node 120).

In the example, the database accelerator device 130 takes the form of a hardware unit (e.g., memory device) that comprises one or more database accelerator engines 170 and memory 180A. As shown, the database accelerator engines 170 can communicate back to the central processing node 120 via the memory communication channel 127, which can be the usual channel used by the central processing node 120 to access memory 180A or 180B. The central processing node 120 can bypass the database accelerator engines 170 when accessing the memory 180AS or 180B via the communication channel 127. In practice, the memory 180B can be situated outside of the database accelerator device, as long as the database engines 170 are near the memory 180B as described herein.

In addition to the memory on the database accelerator device 130, the central processing node 120 can also interface with additional memory modules that are external to the database accelerator device 130 and external the central processing node 120.

Example 3

Example Central Processing Node

In any of the examples herein, execution of the database application can be carried out by a central processing node. Such a central processing node can comprise one or more central processing units or other hardware configured to execute software. In practice, the central processing node can comprise additional hardware, such as a co-processor, graphics processor, and the like.

For sake of convenience, a central processing node is sometimes simply referred to as a "CPU" herein.

Example 4

Example Near-Memory Items

In any of the examples herein, when an item (e.g., database accelerator engine, database accelerator kernel, or the like) is described as being near memory, such item is near to memory (e.g., a memory module embodying the memory) in a physical or data path (e.g., bus) sense. For example, such an item can be on the same circuit board, hardware unit, device, co-resident with, or otherwise close (e.g., as close as the central processing node) to the memory being directly used by a central processing node, whether main memory, extended memory, or the like.

Example 5

Example Directly Accessible Memory

In any of the examples herein, the memory to which the database accelerator is near can operate as memory that is directly accessible by the central processing node and can be at least a portion of the main in-memory database store of an in-memory database management system as described herein. The memory of the near-memory accelerator system can be accessed by both the central processing node and the database accelerator engine (e.g., via a memory controller).

Data that is subject to offloaded database operations (e.g., columnar main store of an in-memory database management system) can be located in the directly accessible memories of the near-memory database accelerator system (e.g., via in-memory database configuration as described herein) before an offloading request is received.

In practice, directly accessible memory can be situated in and comprise at least a portion of main memory, extended memory, or the like. The central processing node can access such memory directly (e.g., using the main memory bus or extended memory hardware), bypassing the database accelerator.

In practice, such an arrangement can provide the benefit of avoiding moving data close to a main central processing node (e.g., because the data is already there) and/or relieving a central processing node from having to access the memory storing source data for database operations. As a result, processor-memory bandwidth interaction at a central processing node can be used for other operations instead of offloaded database operations, resulting in overall performance improvement as described herein.

Directly accessible memory is differentiated from memory that is reserved or dedicated for hardware acceleration that is not addressable by the central processing node. In such a case, the hardware accelerator may be near memory, but it is not near the memory that can be directly accessed by the central processing node.

Thus, a "near-memory" database accelerator can take the form of a database accelerator in which the implementing hardware is near the memory on which the source data resides, where such memory is the memory directly accessible by the central processing node. In this way, the data can already be in place in memory, and bandwidth of the data path between the central processing node and the memory can be relieved and used for other processing tasks instead of being consumed by offloaded database operations.

For example, an item such as a database accelerator engine can be a memory peer of the central processing node in that both the database accelerator engine and the central processing node are able to access memory; the central processing node can bypass the database accelerator engine to directly access memory, and the database accelerator engine can access the same memory without consuming resources of the central processing node.

Because the memory can be written to and read by both the database accelerator and the central processing node, data consistency and/or read/write conflicts can occur during execution of offloaded database operations. Accordingly, such can be avoided by locking mechanisms that keep the main-store area conceptually read-only during the lifetime of a query including execution of the offloaded database operation.

Example 6

Example Specific Database Accelerator Hardware Environment

Figure 2:
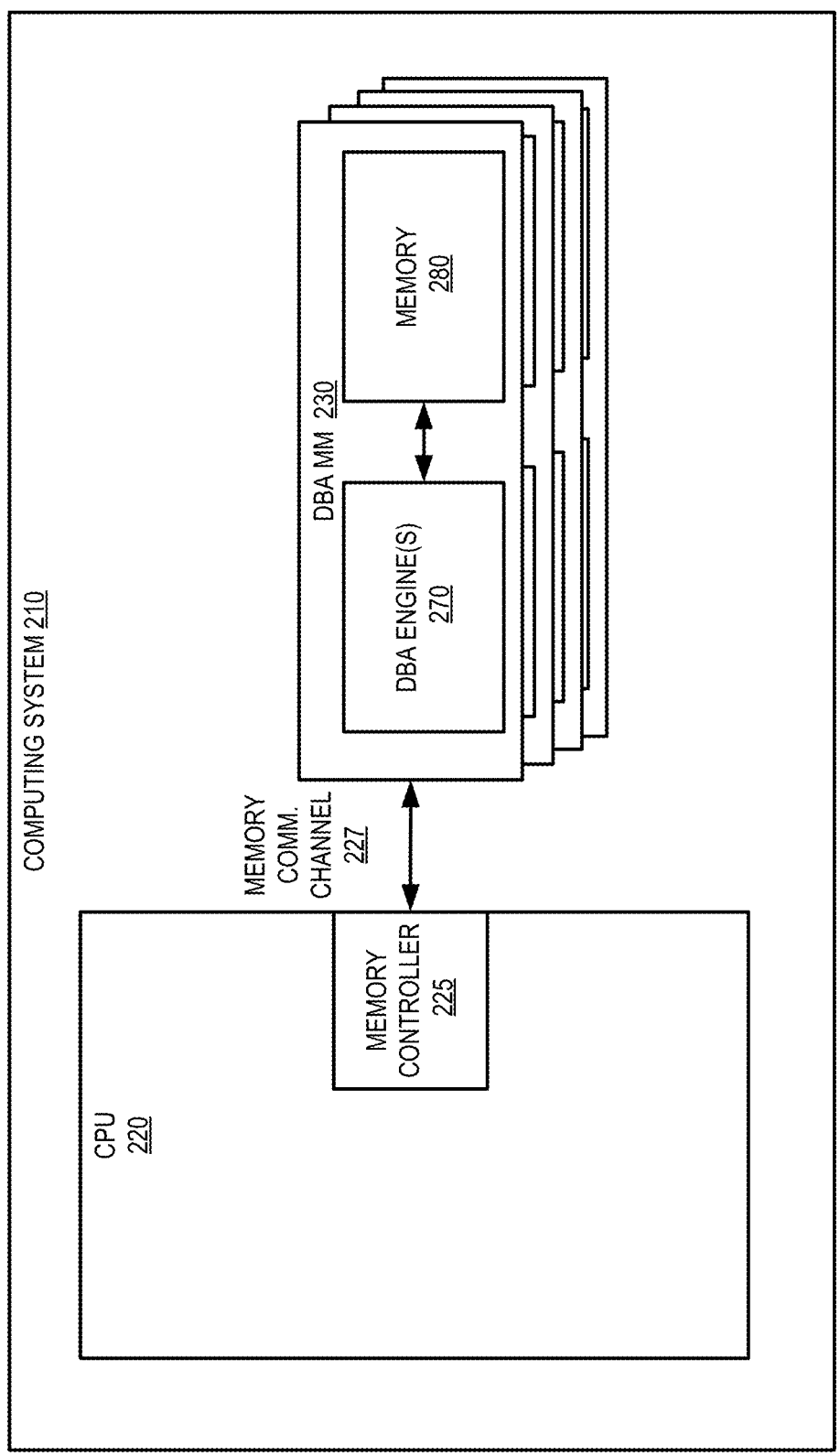
FIG. 2 is a block diagram of an example memory module hardware environment in which near-memory acceleration for database operations can be implemented.

In a more specific example of FIG. 1, a database accelerator hardware environment can include a database accelerator in the form of a memory module (i.e., a database accelerator memory module). FIG. 2 is a block diagram of an example memory module hardware environment 200 in which near-memory acceleration for database operations can be used to implement near-memory acceleration for database operations in any of the examples herein. In the example, a computing system 210 comprises a central processing node 220 and one or more database accelerator devices 230, which take the form of memory modules.

The central processing node 220 can employ a memory controller 225 to communicate with the memory module 230 over a memory communication channel 227. Different types of memory communication channels are possible. For example, PCI, PCIe, DDR memory interface (e.g., DDR4), or another bus standard can be used; memory-mapped I/O can be supported as described herein.

In the example, the database accelerator device takes the form of a memory module 230 (e.g., memory device) that comprises one or more database accelerator engines 270 and memory 280. The memory module 230 can fully function as a normal memory device, but also have the ability to perform offloaded database operations as described herein. As shown, the database accelerator engines 270 can communicate back to the central processing node 220 via the memory communication channel 227, which can be the same channel used by the central processing node 220 to directly access memory 280, and the central processing node 220 can bypass the database accelerator engines 270 when accessing the memory 280 via the memory communication channel 227. In practice, the database accelerator engine 270 can be placed on the same device (e.g., circuit board) as the memory 280.

In addition to the memory on the memory module, the central processing node 220 can also interface with additional memory modules that are external to the memory module 230 and the central processing node 220.

In addition to the memory 280 on the database accelerator memory module 230, the central processing node 220 can also interface with additional memory modules or other memory that do not have a database engine.

Example 7

Example Specific Database Accelerator Hardware Environment

Figure 3:
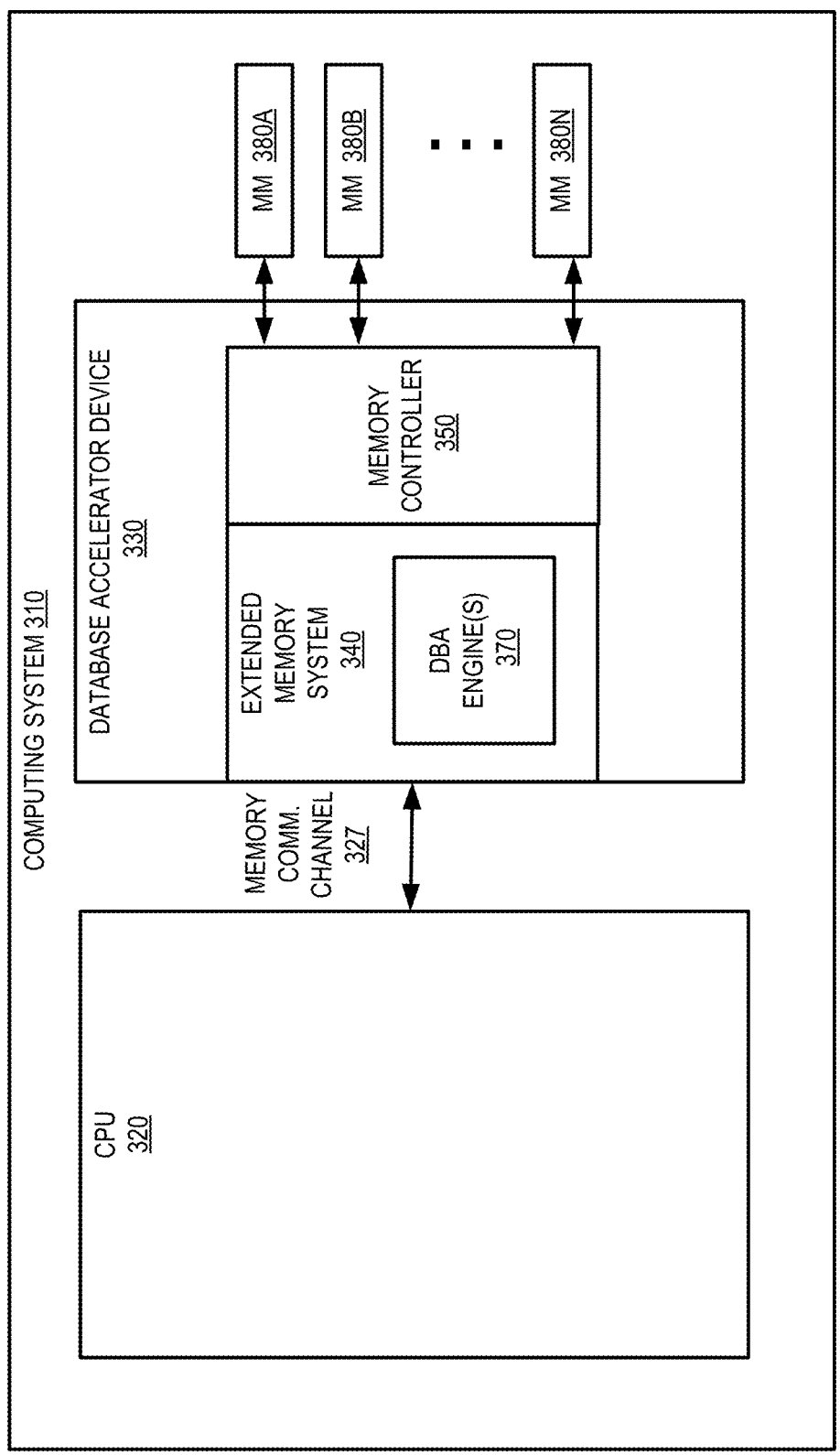
FIG. 3 is a block diagram of an example extended memory system environment in which near-memory acceleration for database operations can be implemented.

In a more specific example of FIG. 1, a database accelerator hardware environment can include a database accelerator in an extended memory environment. FIG. 3 is a block diagram of an example extended memory system environment 300 in which near-memory acceleration for database operations can be implemented in any of the examples herein. In the example, a computing system 310 comprises a central processing node 320 and one or more database accelerator devices 330. Unlike the system of FIG. 2, the memory controller 350 is behind the database accelerator engine 370 from the perspective of the central processing node 320.

The central processing node 320 can communicate with the database accelerator device 330 over a memory communication channel 327. For example, PCIe, CXL (e.g., in conjunction with PCIe) or other CPU-memory interconnect standards can be used to communicate with an extended memory system 340 that then interfaces with a memory controller 350 that accesses the memory modules 380A-380N. A cache coherent interface can be used.

In the example, the database accelerator device 330 takes the form of a hardware unit (e.g., device such as a controller) that comprises an extended memory system 340 comprising one or more database accelerator engines 370. In practice, a database accelerator engine can be implemented as a controller with specialized database accelerator engine hardware (e.g., system on a chip or the like) or a virtual database accelerator engine, where the database accelerator engine logic is programmed into a controller.

As shown, the database accelerator engines 370 can communicate back to the central processing node 320 via the memory communication channel 327, which can be the same channel used by the central processing node 320 to directly access memory 380A-N, and the central processing node 320 can bypass the database accelerator engines 370 when accessing the memory 380A-N via the memory communication channel 327. In practice the database accelerator engine 370 can be placed on the same device (e.g., circuit board) as the extended memory system 340 and the memory controller 350.

In addition to the memory 380A-N accessed via the extended memory system 340, the central processing node 320 can also interface with additional memory modules that are external to those accessed via the extended memory system 340 and the central processing node 320.

Example 8

Example Near-Memory Database Accelerator System Architecture

Figure 4:
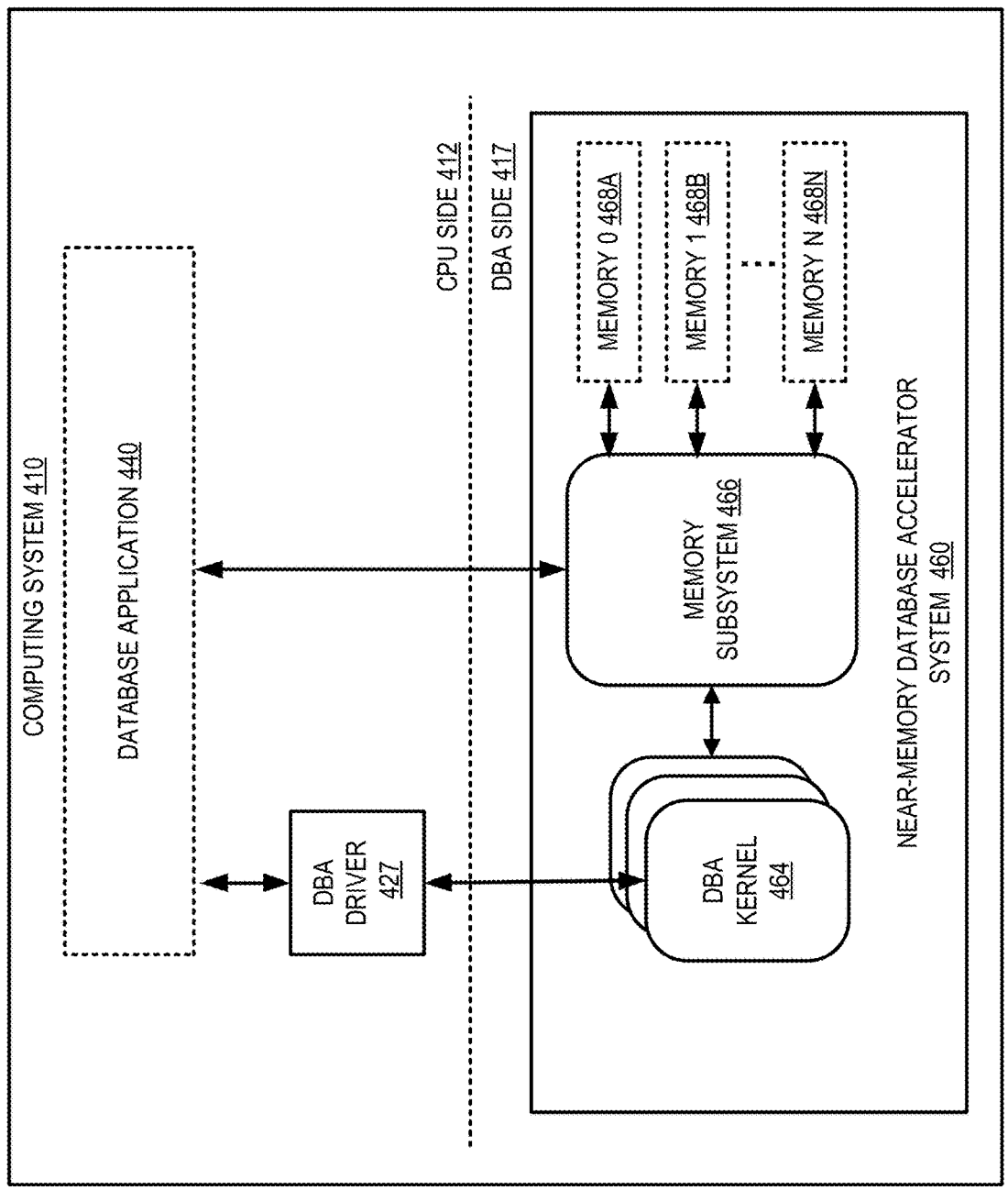
FIG. 4 is a block diagram of an example system architecture implementing near-memory acceleration for database operations.

FIG. 4 is a block diagram of an example system architecture 400 implementing near-memory acceleration for database operations that can be used in any of the examples herein. In the example, a computing system 410 comprises a near-memory database accelerator system 460 (e.g., implemented in a database accelerator hardware environment), and a database accelerator driver 427. In the example, the near-memory database accelerator system 460 is sometimes called a "host" because it can receive and process offloading requests from a database application 440 (e.g., via the database accelerator driver 427).

In the example, the near-memory database accelerator system 460 comprises one or more database accelerator kernels 464 (e.g., executed by respective database accelerator engines as shown herein), a memory subsystem 466, and memory blocks 468A-468N. In practice, the memory blocks 468A-468N can correspond to memory modules or be logical blocks of memory therein.

For purposes of distinction, some of the parts of the system 400 are described as being on the "central processing unit side" 412, while others are described as being on the "DBA side" 417. Notably, the database application 440 and the driver 427 are executed by a central processing node that can be separate from the hardware of the near-memory database accelerator system 460 that executes the data base accelerator kernels 464 (e.g., the respective database accelerator engines).

Example 9

Example Near-Memory Database Accelerator System Component Architecture

Figure 5:
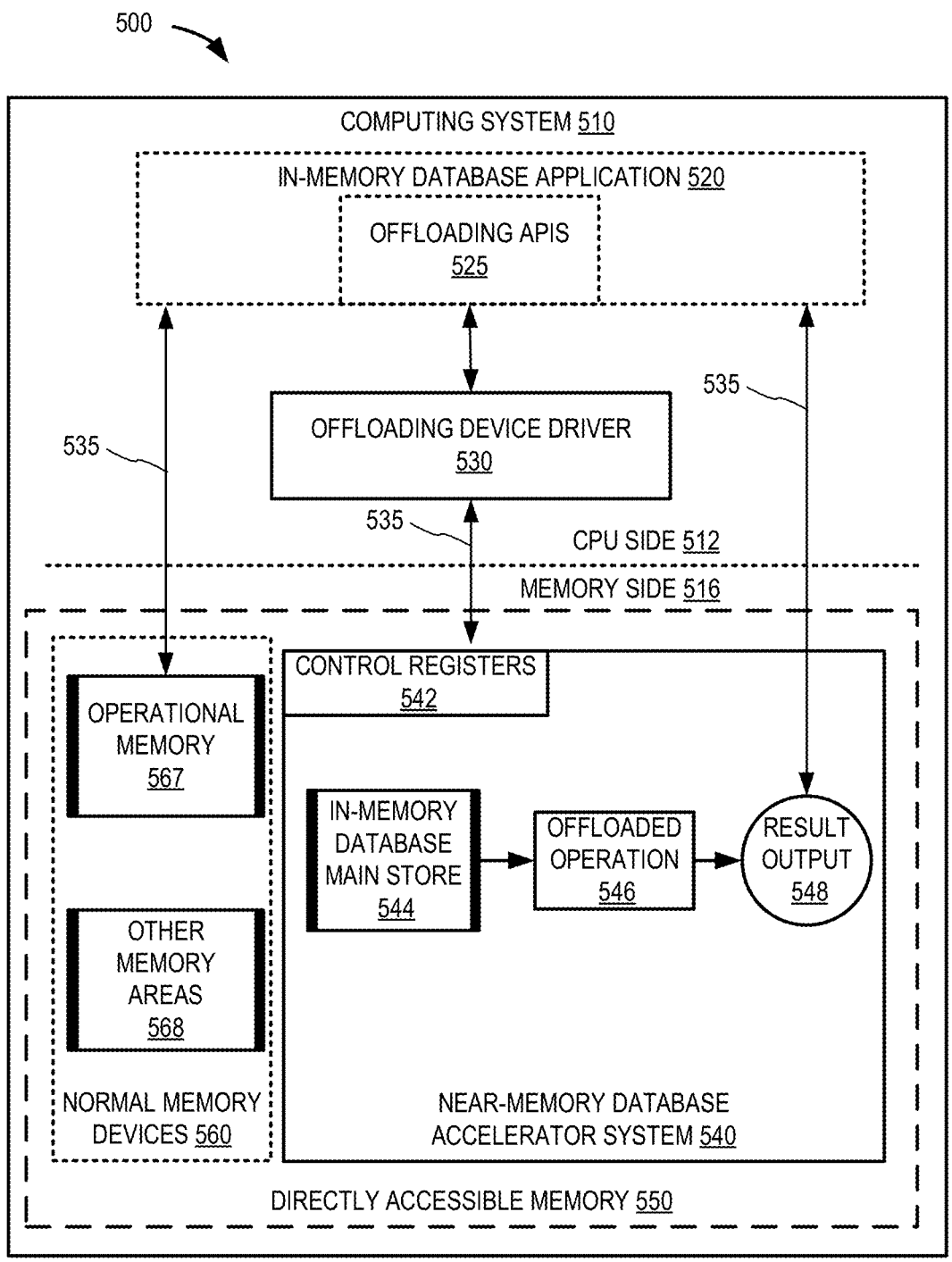
FIG. 5 is a block diagram of an example system implementing near-memory acceleration for database operations.

FIG. 5 is a block diagram of an example system 500 implementing near-memory acceleration for database operations. In the example, a computing system 510 comprises an in-memory database application 520, an offloading device driver 530, and a near-memory database accelerator system 540.

The in-memory database application 520 can interface with the offloading device driver 530 via offloading APIs 525.

For purposes of distinction, the system can be described as having a central processing unit side 512 and a memory side 516. The central processing unit side 512 is executed by hardware that is separate from the hardware that executes the DBA side 516.

Any number of memory configurations can be used to achieve the near-memory database accelerator technologies. In the example, the near-memory database accelerator system 540 can comprise at least a portion 544 of the in-memory database main store. The in-memory database main store 544 can store one or more elements of an in-memory database, including source values for the offloaded operation 546. The in-memory database main store 544 is stored in memory that is near to the hardware of the database accelerator that performs the offloaded operation 546 to generate the result output 548. For example, one or more database accelerator engines of the system 540 can execute one or more database accelerator kernels to perform database operations.

Database accelerator memory modules can store the portion 544 of the in-memory database main store and the result output 548. Such memory modules can be separate from existing memory modules that provide operational memory 567, which exists outside of the near-memory database accelerator system 540. Other memory device 568 can be part of the directly accessible memory 550 of the computing system 510; the directly accessible memory 550 can include main memory as well as extended memory also accessed by the near-memory database accelerator system 540.

In practice, the portion 544 of the in-memory database main data store can include a columnar main store (e.g., compressed values in a database column of a columnar in-memory database). The database accelerator memory modules can also store temporary data (e.g., data generated as part of database operation processing, such as uncompressed values determined during decompression, interim join results, or the like). Additional temporary data can be stored in the operational memory 567. Such temporary data can typically be deleted after completion of the database operation processing.

Results such as uncompressed values (e.g., during a lookup) or filtered values (e.g., of a scan) can be kept in the memory of the near-memory accelerator system 540. Other temporary data can remain in the normal memory devices 560.

The near-memory database accelerator system 540 can also include control registers 542 that control the offloading process (e.g., to indicate which kernels are occupied and the like).

In practice, the systems shown herein, such as system 500, can vary in complexity, with additional functionality, more complex components, and the like. For example, there can be additional functionality within the offloading device driver 530. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 500 and any of the other systems described herein can be implemented in conjunction with any of the hardware components described herein, such as the computing systems described below (e.g., database accelerator hardware, processing units, memory, and the like). In any of the examples herein, the source data, compression parameters, result output, and the like can be stored in one or more computer-readable storage media or computer-readable storage devices. The technologies described herein can be generic to the specifics of operating systems or hardware and can be applied in any variety of environments to take advantage of the described features.

Example 10

Example Near-Memory In-Memory Database Acceleration Method

Figure 6:
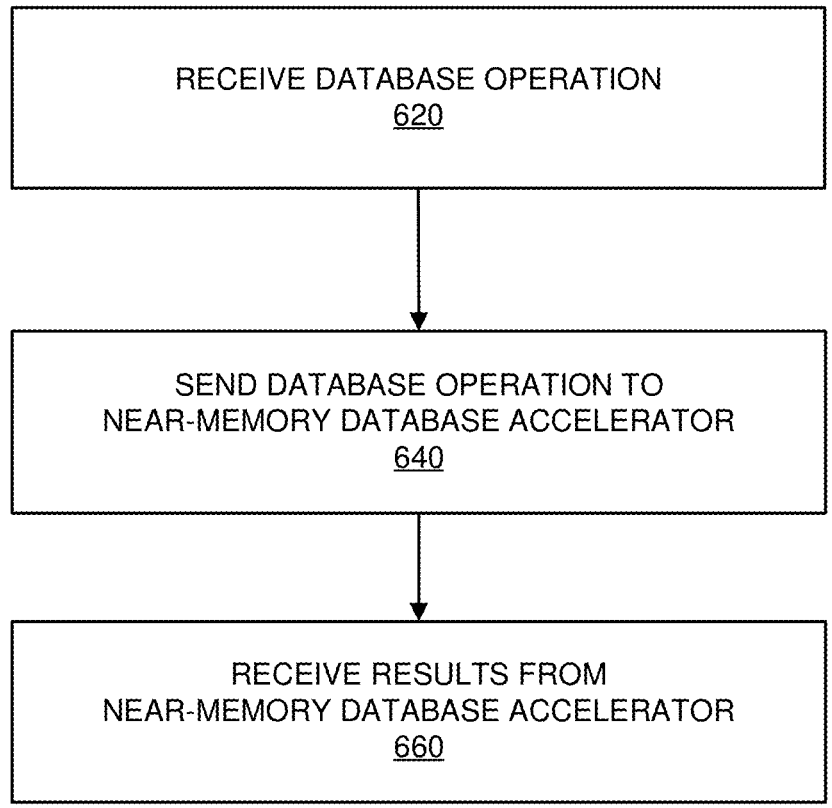
FIG. 6 is a flowchart of an example method of near-memory acceleration for database operations in an in-memory environment.

FIG. 6 is a flowchart of an example method 600 of near-memory acceleration for database operations in an in-memory database environment that can be implemented, for example, in the systems of FIG. 1, 4, or 5. For example, the method 600 can be performed in a driver that receives requests to offload database operations to a near-memory database accelerator.

In practice, the source data for a database operation can be already stored in device memory of a near-memory database accelerator. For example, in an in-memory database management system, database elements can ordinarily be stored in memory or configured to be so stored as described herein. Therefore, the database operations can be performed on the source data in situ without having to move the source data into memory dedicated for offloading. Instead, the source data is stored in memory that is directly accessible by the central processing node (e.g., which can bypass the database accelerator engine(s) and kernel(s)).

So, before receiving the request, the source data can be stored in device memory of a near-memory database accelerator as specified by in-memory database management system configuration information.

At 620, a request to perform a database operation in an in-memory database management system environment is received. As described herein, such a database operation can be specified as to be performed on a plurality of values represented in source data stored in device memory. The source data is stored in device memory of a near-memory database accelerator. In practice, the source data may already be stored in such device memory as part of processing by the in-memory database management system. The device memory can be directly accessible by a central processing node (e.g., that is processing the request).

As described herein, the request can be received from an in-memory database management system via an application programming interface for any of the database operations described herein (e.g., scan, lookup, or the like).

The request can be received from a database application such as an in-memory database management system as a result of determining, within the in-memory database management system, that the request is to be offloaded. For example, a hosted application in the in-memory database management system can send a plurality of requests for database operations, and the in-memory database management system can decide which database operations are to be offloaded based on offloading criteria. Such criteria can include whether the operation involves high CPU usage, whether the operation involves huge data access with high memory bandwidth usage, whether there is a high ratio of sequential (versus random) access, and the like.

Scan and lookup operations are typical candidates for offloading. In some cases, several scan and/or lookup offloading requests might be sent close in time, which might exceed the capacity of the prepared near-memory accelerator system. So, the length of the request queue can also be considered when determining whether to offload operations. Responsive to determining that queue of database operations set for execution at a database accelerator is over a threshold length, the database operation can bypass offloading and be executed on the central processing node instead.

At 640, the database operation is sent to a near-memory database accelerator (e.g., offloaded for execution by the near-memory database accelerator). As described herein, the near-memory database accelerator can comprise both the memory in which the source data is stored and hardware to execute the database operation on the source data (e.g., which is near to the device memory in which the source data is stored) or be part of an extended memory system.

The near-memory database kernel (e.g., running on a near-memory database engine) can execute the database operation on the source data. Such execution generates results of the database operation.

At 660, results of the database operation performed on the source data are received from the near-memory database accelerator.

In practice, the process can be repeated a plurality of times (e.g., for a number of database operations that are offloaded). Parallelism can also be supported by breaking the operation into smaller pieces that are executed concurrently on the database accelerator.

As described herein, offloading can relieve a central-processing-unit-to memory data path for other processing (e.g., other than the requested database operation).

The method 600 can incorporate any of the methods or acts by systems described herein to achieve near-memory database acceleration technologies as described herein.

The method 600 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, sending a request from a driver can also be described as receiving a request at a database accelerator.

Example 11

Example Database Operations

In any of the examples herein, database operations can take the form of any operation performed by an in-memory database management system on source data as part of database processing. In practice, such operations are performed on database tables, columns, or portions thereof. For example, a table scan can be performed on a columnar database to determine those rows that have values matching a specified predicate or condition. The technologies described herein can be extended to any number of database operations, including lookup, addition, multiplication, and the like.

Such database operations calculate a result that is passed back to the calling application. As described herein, the result can be stored in memory local to the database accelerator and passed back to the calling application by reference. For example, in the case of a table scan, a vector (e.g., bitmap or the like) indicating which rows of the database table meet the predicate or condition can be returned.

As described herein, source values in an in-memory database main store can be in compressed form; therefore, a database operation, can also further comprise decompression to access the underlying data as described herein.

Example 12

Example Memory Module

In any of the examples herein, a memory module can take the form of hardware memory that typically comprises a series of dynamic random-access memory integrated circuits on a circuit board. The actual memory technology implemented in hardware can vary in practice.

The hardware configuration of a memory module can take the form of a dual in-line memory module (DIMM), a single in-line memory module (SIMM), or the like.

The data path can vary depending on hardware considerations (e.g., 32-bit, 64-bit, or the like).

In a near-memory database accelerator implementation, hardware for executing database operations can be included near the memory module (e.g., on the same circuit board, hardware unit, device, or otherwise closer to the memory than the main central processing unit).

In practice, the near-memory database accelerator technologies herein can be implemented independently of the underlying memory module technologies.

Example 13

Example Database Accelerator Engines

In any of the examples herein, database accelerator engines that calculate results of offloaded database operations (e.g., by executing a database accelerator kernel) can be implemented by a variety of hardware. Such hardware can take the form of near-memory processors (e.g., executing executable software to implement the kernels), FPGAs, ASICs, or other specialized or dedicated hardware.

In practice, a database accelerator engine can comprise a system-on-a-chip (SoC) hardware component; additional chip(s) for implementing database accelerator engines and supporting subsystems of the database accelerator can be placed on a memory module (e.g., the memory module 230 or the like). In practice, the database accelerator so that it supports the functions of the APIs described herein (e.g., by including an appropriate library).

Example 14

Example Database Accelerator Kernels

In any of the examples herein, database accelerator kernels can include the software or firmware that calculates results of offloaded database operations. Such software or firmware can take a variety of forms such as executable code, hard-coded logic, gate logic, or the like. As described herein, a kernel can also perform decompression to access underlying data values.

Example 15

Example Separate Execution

In any of the examples herein, the database accelerator engine for executing offloaded database operations can be separate from the central processing node (e.g., main central processing unit) that is executing a database application. As described herein, such separateness can be achieved by placing the database accelerator engine on a different circuit board, different hardware unit, device, or otherwise further away from memory than the central processing node.

Example 16

Example In-Memory Database Application

In any of the examples herein, an in-memory database application can take the form of any software program that takes advantage of in-memory database technologies. A useful example is an in-memory database management system (IMDBMS). However, an in-memory database application can take the form any application that ultimately implements in-memory database technology as described herein (e.g., by offloading database operation).

The in-memory database application can both request database accelerators to perform database operations on source data described herein as well as directly access the source data by bypassing the database accelerators.

In practice, the in-memory database application can support hosted applications and thereby provide such applications with access to the source data to enable a variety of database use cases.

The in-memory database application can receive requests for database operations from a hosted application, which the in-memory database application then decides whether to offload or not depending on offloading criteria. In practice, if not all memory uses database acceleration, the decision of whether to offload can be made ahead of time (e.g., before receiving the request) so that the source data is already in a memory location that can benefit from database acceleration.

In practice, access to database acceleration can be limited to elevated systems, such as an in-memory database management system that implements access control. Any number of in-memory database applications can take advantage of the technologies described herein, including the SAP HANA system engineered by SAP SE of Walldorf, Germany and other in-memory database management systems.

Example 17

Example In-Memory Database Technologies

In any of the examples herein, the database accelerator technologies can support performing database operations (e.g., by a near-memory database accelerator) on source data that comprises in-memory database components that are stored in memory (e.g., of the device memory of the near-memory database accelerator) according to in-memory database technologies. In-memory database components such as one or more tables, one or more table columns, or the like can be stored in memory, resulting in increased performance as compared to storing in secondary storage. As described herein, the memory to which the near-memory database accelerator is near can be at least a portion of the main store of the in-memory database management system.

In practice, because a limited amount of memory is typically available, in-memory database technologies can take advantage of data compression. For example, an in-memory columnar data store can use compression to represent a large number of values in a limited amount of memory space.

Depending on the use case scenario, different types of compression can be used, and in-memory database technologies can support a mix of such compression types across different columns.

When database accelerators are applied to an in-memory database environment where source data is compressed, the database accelerators can perform decompression to access the underlying data of the database as part of executing a database operation. As a result, decompression processing is offloaded from the central processing node to the database accelerator.

Compression information of the source data can be included in the request as described herein. The near-memory database accelerator can use such information for decompression of the source data. Such information can comprise parameters that are applied during decompression. For example, if the source data is compressed according to a bit-packed compression format, the compression information can specify a number-of-bits for the bit-packed compression format.

As described herein, source data can comprise database table values in a column format. Operations such as table scan or lookup for a specified predicate can be supported. Results indicate for which database column values the predicate is valid.

Whether or not values are stored in-memory can be controlled by an in-memory database management system, which uses heuristics to determine which values (e.g., tables, columns, partitions, or the like) are to be stored in memory. Manual specification of in-memory database components can be supported to allow configuration flexibility.

To work together with the database accelerator technologies described herein, an in-memory database management system can be near-memory-database-accelerator aware. For example, in systems where some memory is accessible by a database accelerator and some is not, configuration of the in-memory database management system can support specification of which tables or table elements are to be stored in memory that is accessible by a database accelerator. Such configuration of whether or not a database table or database element is stored in such memory can be guided by automated criteria or manually specified by a database administrator.

Example 18

Example In-Memory Database Memory Layout

In any of the examples herein, an in-memory database management system can maintain a main store as well as operational memory that includes a delta area. Recent changes to the in-memory database can be placed into the delta area. Consequently, in a periodic delta-merging process, information in the delta area can be periodically merged into the main store. In practice, database operations can be run against a main store. Results can then be reconciled against the delta area, if any.

In an in-memory database management system, the database accelerator engine can perform a database operation on the main store and provide a result which can then be reconciled against the delta area. In such an arrangement, the operational memory that includes the delta area can be separate from the main store. So, for example, in FIG. 2, at least a portion of the main store can be stored in the memory 280 of the database accelerator memory module 230, while operational memory that comprises a counterpart delta area can be stored in other memory (e.g., outside of the database accelerator memory module 230). A similar approach is possible for the extended memory system arrangement of FIG. 3. Such operational memory can be, but need not be, enhanced with a database accelerator engine.

In practice, the main store of the in-memory database (e.g., and thus the memory on which the database accelerator performs a database operation) can be implemented as non-volatile memory (e.g., NVDIMM or the like), while operational memory and the delta area are stored in DRAM.

Example 19

Example Near-Memory In-Memory Database Accelerator

In any of the examples herein, a near-memory in-memory database accelerator (sometimes simply called "database accelerator" or "DBA" herein) can take the form of a device that has both memory and one or more database accelerator engines implemented in hardware (e.g., which is near to the memory) or an extended memory system and one or more database accelerator engines implemented in hardware (e.g., which is near to the memory).

Figure 11:
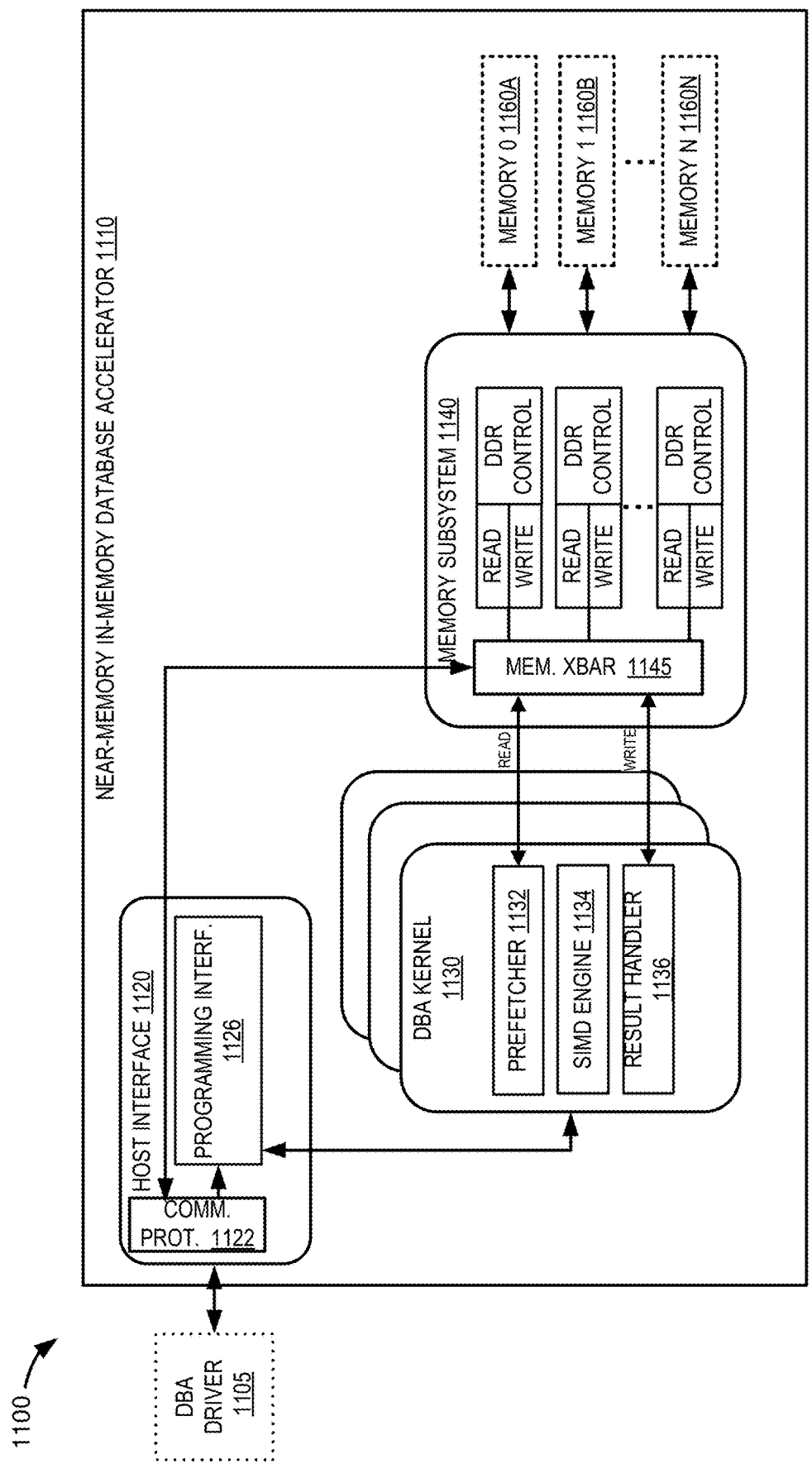
FIG. 11 is a block diagram of a microarchitecture supporting near-memory acceleration for database operations.

Examples of in-memory database accelerators are shown as 130 in FIG. 1, 230 of FIG. 2, 330 of FIG. 3, 460 of FIG. 4, 540 of FIG. 5, and 1110 of FIG. 11.

A near-memory database accelerator system is sometimes called a "host" because it can receive and process offloading requests from an in-memory database application (e.g., via a database accelerator driver) as described herein.

In practice, such a database accelerator can comprise subsystems such as one or more database acceleration engines executing respective kernels (e.g., that calculate database operation results), memory subsystems, and the like.

A memory device can be altered to also comprise database acceleration engines that calculate results of database operations that access the memory on the memory device as source data. Operations can then be offloaded to such memory devices, which are a form of database accelerator.

As described herein, near-memory in-memory database accelerators can execute offloaded database operations locally on the in-memory source data in place (or "in situ"), and the source data can be placed into directly accessible memory beforehand by a central processing node as described herein without having to move it to a dedicated area separate from the directly accessible memory. Such an approach greatly reduces the amount of data movement needed to perform the offloaded database operations. For example, comparison of values need not be done by central processing nodes for offloaded database operations. Data decompression calculations can thus also be offloaded to the database accelerator as described herein.

Because the directly accessible memory available to the database accelerator engine can also be directly accessed by the central processing node (e.g., bypassing the database accelerator engine to which processing was offloaded), results placed in directly accessible memory by the database accelerator engine as described herein can be easily obtained.

Example 20

Example Database Accelerator Driver

In any of the examples herein, a near-memory database accelerator driver (or simply "driver" herein) can be implemented. In practice, such a driver can provide an abstraction layer between software taking advantage of the database accelerator technologies and the details of the underlying hardware that implements the actual database accelerator. For example, the driver can be implemented as a library of software functions that carry out CPU-to-database-accelerator communication functionality.

Requests can be received from an in-memory database application by the driver that interacts with the near-memory database accelerator on behalf of the application. As described herein, a database operation can be divided into smaller operations that are executed by the near-memory database accelerator in parallel.

Source data can be specified to the driver as a virtual address. The driver can translate the virtual address to a device physical address. The driver can first obtain the system physical address by referring to a page table. Then, the device physical address can be translated to a system physical address based on information from system BIOS which stores the start system physical address of device memory in base address (BAR) registers at boot time.

As described herein, the driver can be configured to receive a request to perform a database operation on source data stored in device memory of a near-memory database accelerator comprising at least one database accelerator engine separate from the one or more processing units (central processing node), offload the database operation to the near-memory accelerator for execution by the at least one database accelerator engine separate from the one or more processing units, and receive an indication from the near-memory database accelerator that results of the database operation are available. The calling application can then retrieve the results. As described herein, the source data can be stored in directly accessible memory of one or more processing units. Such processing units can access the directly accessible memory directly, thereby bypassing the database accelerator. Thus, the main memory or extended memory comprises the device memory of the near-memory database accelerator. The device memory is thus part of main memory or extended memory, which is directly accessible by the central processing units.

Example 21

Example More Detailed Method

Figure 7:
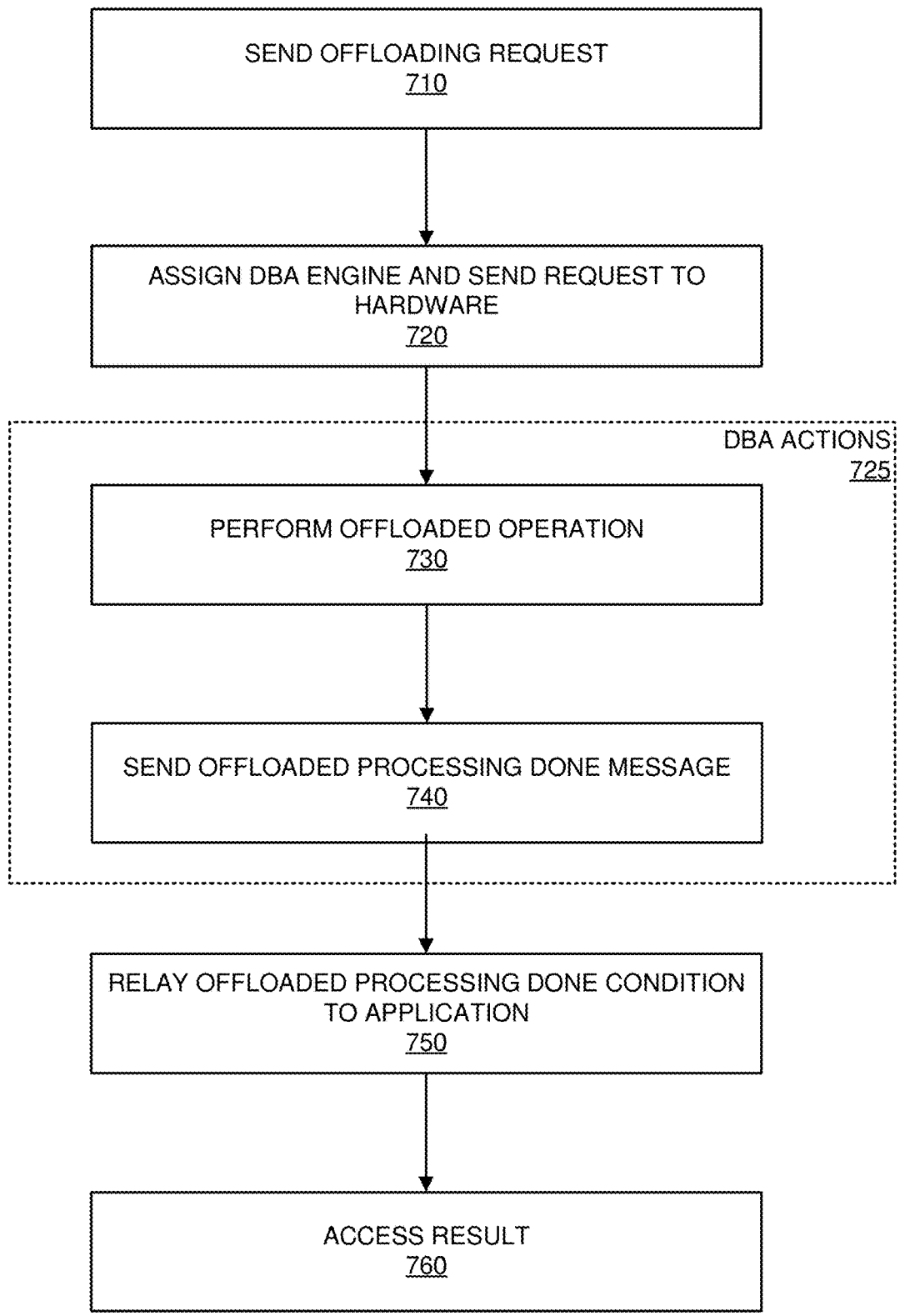
FIG. 7 is a flowchart of an example more detailed method of near-memory acceleration for database operations in an in-memory environment.

FIG. 7 is a flowchart of an example more detailed method 700 of near-memory acceleration for database operations in an in-memory environment that can be implemented in any of the examples herein, such as the systems shown in FIGS. 1, 2, 3, 4, and 11.

The method 700 can be performed responsive to determining that a database operation is to be offloaded (e.g., by an in-memory database management system) to a near-memory database accelerator as described herein.

At 710, an offloading request is sent. For example, an in-memory database application can send a request to an offloading device driver via an offloading API as described herein. In practice, the sender (e.g., process, thread, or the like) can then enter a sleep state until the requested operation is finished.

At 720, a database accelerator engine is assigned, and the request is forwarded to the appropriate hardware. In practice, the driver can choose the hardware that has the source data on which the operation is performed, which can be determined based on the virtual address in the request.

The in-memory database application can simply request that the operation be offloaded, and the request can be inserted into a request queue. The database accelerator kernel can then execute the requests in the queue one by one.

At 730, the in-memory database accelerator performs the offloaded operation, which yields results that are stored locally in the hardware of the database accelerator.

At 740, an offloaded processing done message is sent from the database accelerator back to the driver.

At 750, the offloaded processing done condition is relayed back to the requester. For example, a wakeup message can be sent back to the sender that invoked the API.

At 760, the database application can access the result directly from the memory in which it was stored. For example, an output buffer parameter can be specified as part of the request, and the results can then be stored in the output buffer parameter for access. The location of the results can be passed back to the sender for direct access.

Before requesting offloading by the driver, the in-memory database application can prepare an output area for the results and specify as part of the request. The database accelerator performs the operations and stores the results in the specified output area.

Example 22

Example Memory Communication Channel

In any of the examples herein, a memory communication channel can be provided between the central processing node and the database accelerator. In practice, the same communication channel used to access memory can be used to communicate with the database accelerator. When the central processing node directly accesses memory, it simply bypasses the database accelerator.

For example, communication between the driver and database accelerator can be achieved via a bus standard that support memory mapped I/O (MMIO) (e.g., PCIe or the like) to map device memory in the same address space as the host memory. Byte-addressable access to the memories of the database accelerator can be supported to allow swift communication of data.

Example memory interfaces that can be used for a communication channel include DDR (e.g., DDR4), and the like. Memory interfaces such as Compute Express Link (CXL), Gen-Z, and OpenCAPI can enable a new memory pool hosting the columnar main storage in an in-memory database management system.

Example 23

Example Sequence of Operations

Figure 8:
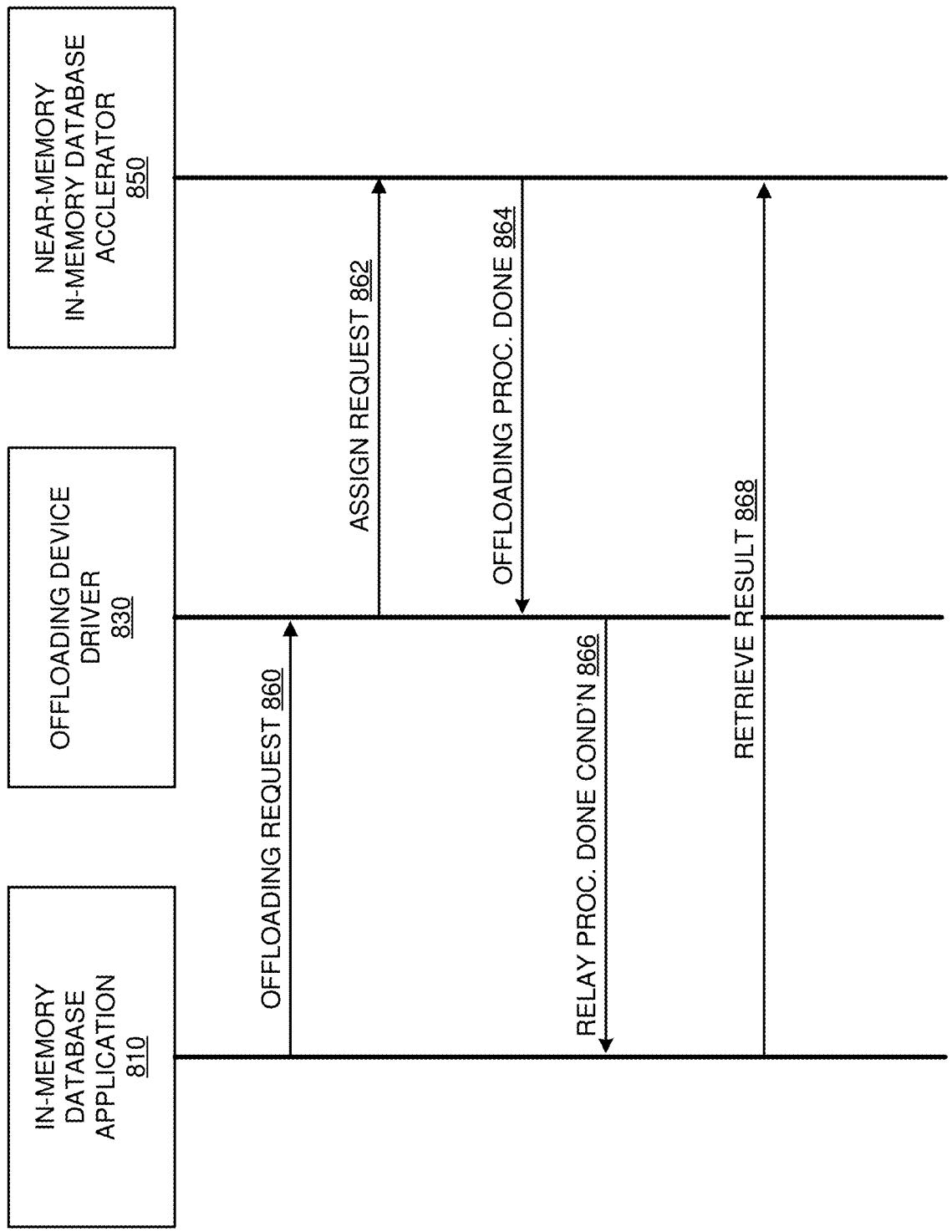
FIG. 8 is a sequence diagram of an example sequence of operations implementing near-memory acceleration for database operations in an in-memory environment.

FIG. 8 is a sequence diagram of an example sequence of operations 800 implementing near-memory acceleration for database operations in an in-memory database environment. Such a sequence of operations can be carried out by an in-memory database application 810, offloading device driver 830, and a near-memory kernel executing at a near-memory in-memory database accelerator 850, working in concert.

At 860, the in-memory database application 810 sends an offloading request to the offloading device driver 830. As described herein, the driver 830 can support an API for sending requests, receiving notifications, and providing results so that applications are shielded from the hardware details of the near-memory in-memory database accelerator 850. The driver 830 assigns the request 862 to the near-memory in-memory database accelerator 850, which then performs the database operation.

Upon completing execution of the offloaded database operation, the near-memory in-memory database accelerator 850 sends 864 an offloaded processing done message to the offloading device driver 830 which then relays 866 the processing done condition to the in-memory database application 810.

Then the in-memory database application 810 can retrieve 868 the result from the near-memory in-memory database accelerator 850 over a communication channel as described herein. Retrieving the results can comprise retrieving the results (e.g., from device memory) to a central processing unit via memory-mapped I/O as described herein. A byte-addressable technique can be used.

In practice, a process or thread of the in-memory database application that sent 860 the offloading request can sleep while waiting for the processing done condition, which wakes the process or thread that can then retrieve the result as shown.

Example 24

Example Request to Perform Database Operation

Figure 9:
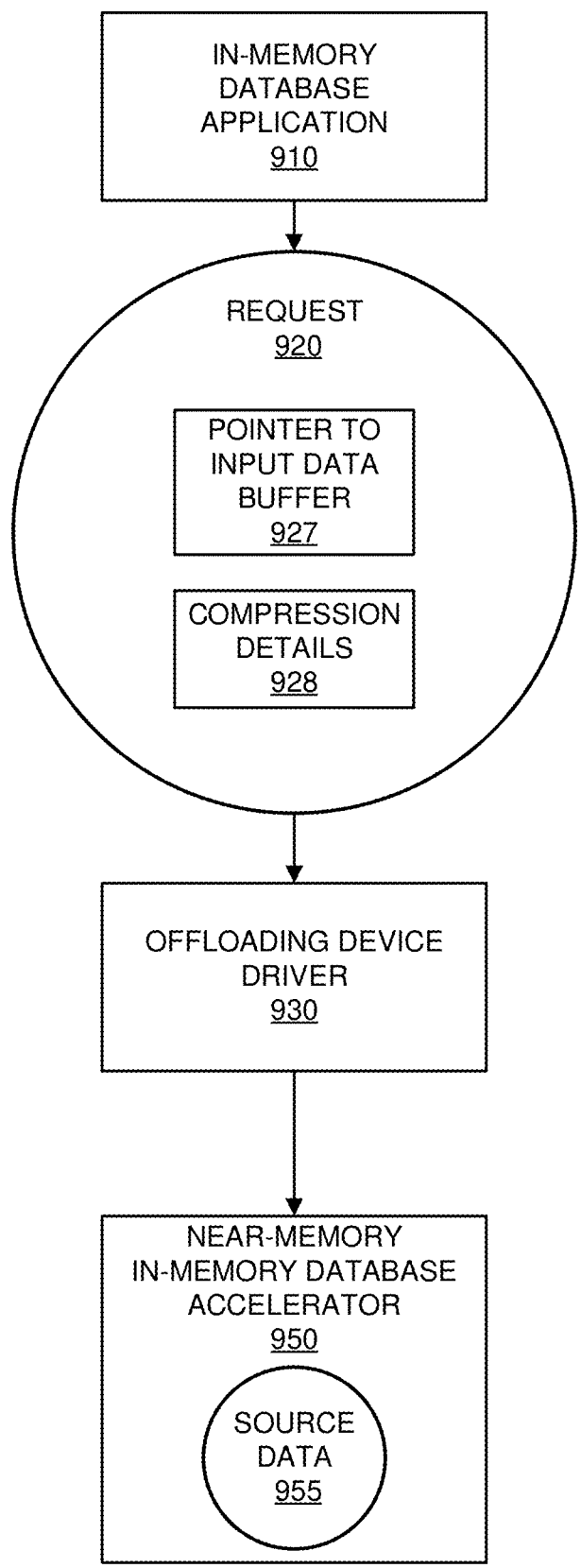
FIG. 9 is a block diagram showing example contents of a request to perform a database operation for use with the technologies herein.

FIG. 9 is a block diagram showing example contents of a request 920 to perform a database operation. In practice, such a request 920 is sent from an in-memory database application (e.g., via API) to an offloading device driver 930 (e.g., a database accelerator device driver), which orchestrates and relays the request to the near-memory in-memory database accelerator 950, which performs the operation in situ on the source data 955, which is stored in memory near to the database accelerator engine of the accelerator 950.

As shown, the request 920 can include an indication of the input data, such as a pointer to the input data buffer 927. A location where results are to be stored can also be included.

Compression details 928 of the source data 955 can also be included as described herein. For example, the number of bits per value can be indicated when the source data 955 represents column values in a bit-packed format. Such information can be leveraged by the near-memory in-memory database accelerator 950 to perform the database operation, when such an operation also involves decompression of the source data 955 (e.g., to determine which values match a specified predicate, which can also be included in the request 920). The type of compression (e.g., which is known by the in-memory database application 910) can also be included.

Other parameters can be included in the request 920 as noted in the description of APIs herein (e.g., to pass back the results and the like).

Example 25

Example Microarchitecture

FIG. 11 is a block diagram of a microarchitecture 1100 supporting near-memory acceleration for database operations. In the example, the near-memory in-memory memory database accelerator 1110 is in communication with a database accelerator driver 1105.

The near-memory in-memory database accelerator 1110 comprises a host interface 1120, one or more DBA kernels 1130, and a memory subsystem 1140 that ultimately interacts with the memories 1160A-N in which in-memory database components are stored.

As shown in the example the host interface 1120 can comprise a communication channel endpoint 1122 that supports a communication (e.g., bus) protocol when interacting with the database accelerator driver 1105. The communication channel 1120 can provide access to the memory crossbar 1145 so that some communications to memory can be achieved without involvement of the database accelerator kernels 1130. The host interface 1120 can also support a programming interface 1126 that interacts with the one or more DBA kernels 1130 so that offloaded database operations can be communicated to the kernels 1130 for execution.

The database accelerator kernels 1130 enjoy close access to the memories 1160A-N by interacting with the memory subsystem 1140. In practice, a given DBA kernel 1130 can comprise a prefetcher 1132, an SIMD engine 1134, and a result handler 1136.

To increase parallelism, the database accelerator kernels can split a database operation into multiple smaller calculations, effectively implementing a local (near-memory) version of a single instruction, multiple data approach. Different kernels can fetch different subsets of source values and perform simple comparisons independently of other kernels; separate results can be packed and written back to the device memories 1160A-N and then read as a composite result.

Such an arrangement can leverage a SIMD approach without consuming precious memory-to-central-processing-node bandwidth.

In practice, multiple database operations can also be executed in parallel. The number of parallel units allocated to an operation can be determined by the number of values in incoming data or other criteria.

Example 26

Example Application Programming Interface

In any of the examples herein, an application programming interface (API) can be provided to facilitate communication between an in-memory database application and one or more database accelerators. The details of the API can vary depending on a variety of criteria. In practice, the API can serve as an abstraction layer that insulates an application from the details of the hardware implementation.

Example 27

Example API: Return Codes

In any of the examples herein, an API can accept a request to offload a database operation and return a return code value to indicate status of the request. For example, one code value can indicate success, and other values can specify failure. If desired, values for partial completion can also be provided.

A value scheme can use zero for successful completion, negative values for failure, and positive values for partial completion. For example, −1 can indicate not accepted; −2 can indicate a request timeout; and the like.

Partial completion can indicate that resizing is needed (e.g., to accommodate row vector output) as described herein.

Example 28

Example API: Scan

Figure 12:
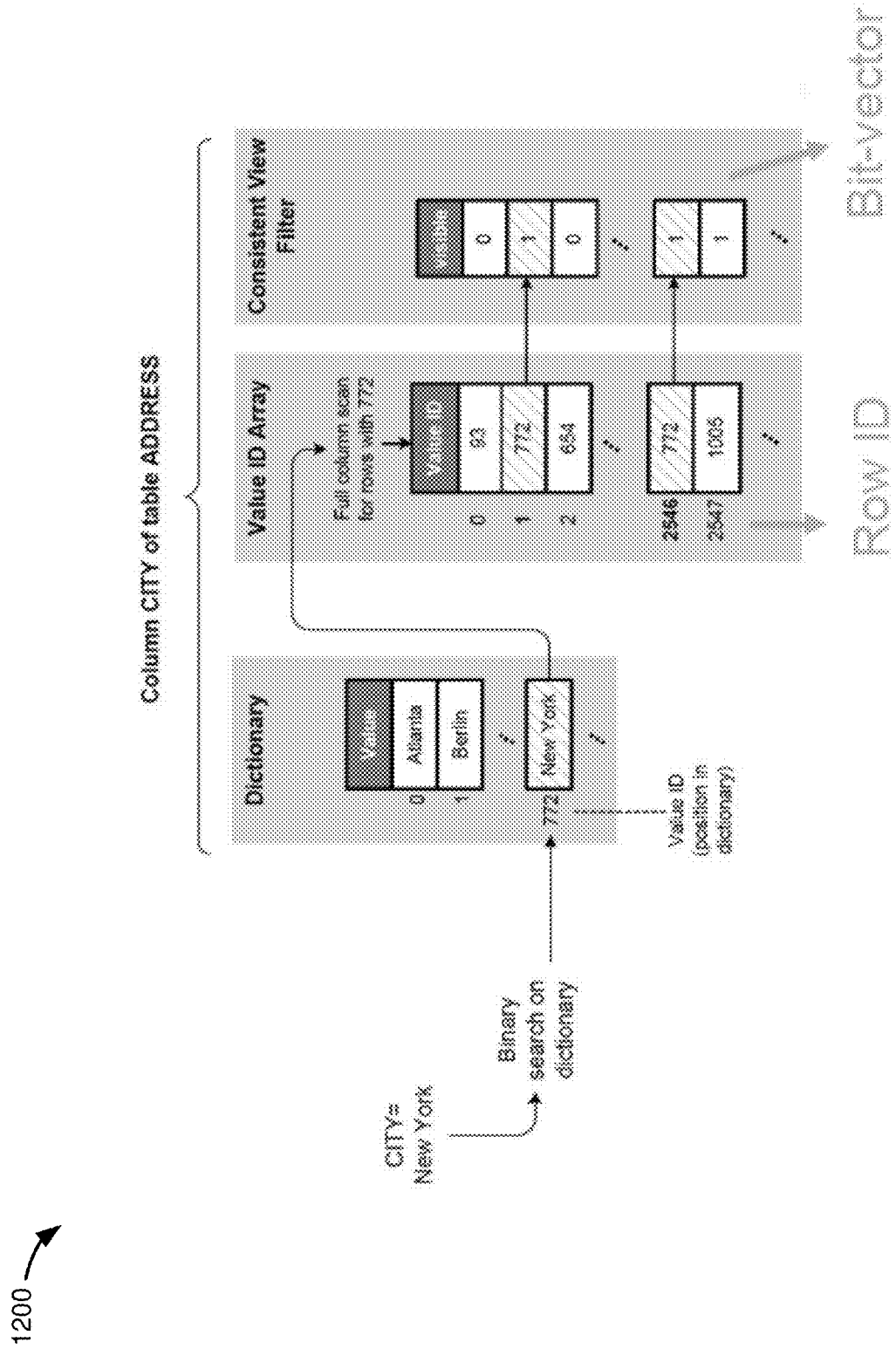
FIG. 12 is a block diagram of an example scan operation in an in-memory database.

In any of the examples herein, an API can accept a request to offload a scan database operation. An example scan operation is shown in FIG. 12. A scan database operation effectively searches a database table and returns the row identifiers satisfying the provided predicate within the row identifier range specified (e.g., by a starting offset and a count).

The output can be a row vector. The row identifiers for which the predicate is satisfied can be stored in the vector. An offloading device can use a pointer instead, which is initially empty. After completing the offloaded processing, the output is written to the given vector, where it can be read by the database application.

Alternatively, the output can be a bit vector, with a bit representing a row. The bit of rows for which the predicate is satisfied can be set (e.g., to 1).

Predicates can take a variety of forms. A range predicate can define a range of value identifiers with two unsigned integer values (e.g., from and to). Alternatively, an in-list predicate can be defined as a bit vector where the bits of satisfying value identifiers are set to 1 (i.e., "match"). Rows in the source data table having values in the column being processed (e.g., or portion thereof) that satisfy the predicate are considered to match and are included in the result (e.g., in a format as described herein).

Example 29

Example API: Scan Function Definitions

The function definition for a scan (e.g., a request to offload/perform a scan database operation) can vary depending on the scan scenario:

```
// (1) Range Predicate & Row Vector Output
int mgetSearch_offloading_impl(uint64_t index, uint64_t
count, uint32_t rangeFrom, uint32_t rangeTo,
    uint64_t* scan_count, const unsigned* prev_start, const
unsigned* start, uint64_t *size, uint64_t capacity,
    const unsigned bits, const uint64_t* data, const uint64_t
mask);
// (2) Range Predicate & Bit Vector Output
int mgetSearch_offloading_impl(uint64_t index, uint64_t
count, uint32_t rangeFrom, uint32_t rangeTo,
    const uint64_t* output, const unsigned bits, const uint64_t*
data, const uint64_t mask);
// (3) In-list Predicate & Row Vector Output
int mgetSearch_offloading_impl(uint64_t index, uint64_t
count, uint64_t* match,
    uint64_t* scan_count, const unsigned* prev_start, const
unsigned* start, uint64_t *size, uint64_t capacity,
    const unsigned bits, const uint64_t* data, const uint64_t
mask);
// (4) In-list Predicate & Bit Vector Output
int mgetSearch_offloading_impl(uint64_t index, uint64_t
count, uint64_t* match,
    const uint64_t* output, const unsigned bits, const uint64_t*
data, const uint64_t mask);
```

The function parameters can be as follows:

| Category | Type | Name | Description |
| --- | --- | --- | --- |
| Common | Uint64_t | index | Starting offset of the row ID range |
| Common | Uint64_t | count | Number of data to scan |
| Range Predicate | Uint32_t | valueFrom | Range predicate "FROM" (INCLUSIVE) |
| Range Predicate | Uint32_t | valueTo | Range predicate "TO" (EXCLUSIVE) |
| In-list Predicate | Uint64_t* | match | In-list Predicate pointer to bit vector |

-continued

| Category | Type | Name | Description |
|---|---|---|---|
| Row Vector Output | Uint64_t* | scan_count | Stop/Go for Row vector output (contains # rows scanned so far) |
| Row Vector Output | Unsigned* | prev_start | Stop/Go for Row vector output (contains the previous array pointer) |
| Row Vector Output | Unsigned* | start | Row vector output array pointer (vector allocation pointer) |
| Row Vector Output | Uint64_t | *size | Stop/Go for Row vector output (contains # data stored in the array) |
| Row Vector Output | Uint64_t | capacity | The allocated capacity of the array |
| Row Vector Output | Uint64_t* | output | Bit vector output pointer |
| Common | Const unsigned | bits | Number of bits per value in the input data (bit-packed index vector) |
| Common | Uint64_t* | data | Pointer to the input data buffer |
| Common | Const uint64_t | mask | Mask value for the input data (Same as (1 << bits) − 1 |

Thus, the input data buffer serves as the source data for the scan, and the results are placed in the bit vector output pointer. Other arrangements are possible.

Example 30

Example API: Scan Resizing Process

In any of the examples herein, during processing of a database operation by the database accelerator, it is possible that the size of output buffer (e.g., a capacity specified in the request) is not large enough. In such a case, responsive to detecting at the database accelerator that the output buffer is not of sufficient size (e.g., based on the capacity parameter) the API can return a result of partial completion. The in-memory database management system can then allocate additional space, and processing can resume.

Figure 13:
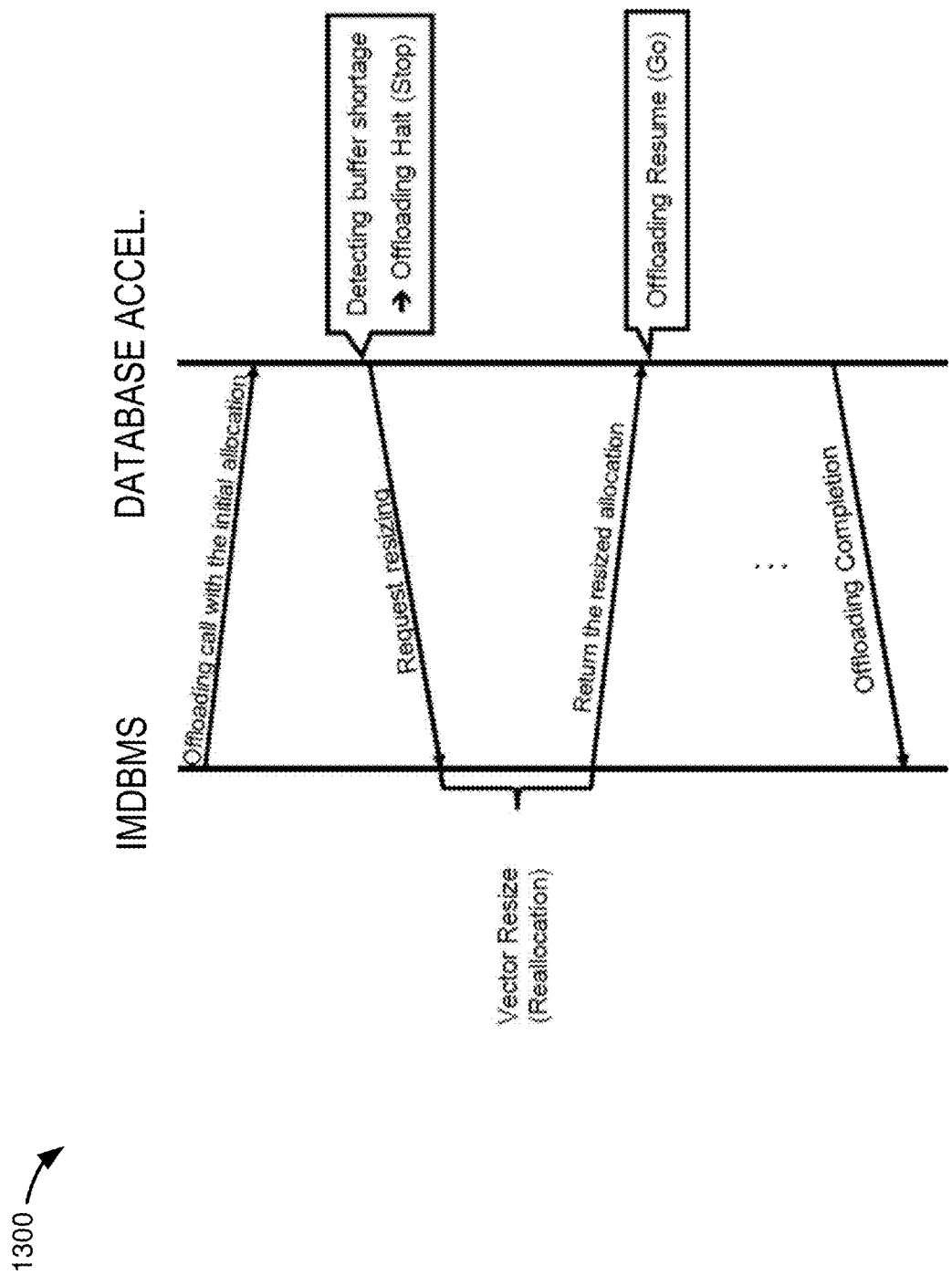
FIG. 13 is a block diagram of an example resizing process of row vector outputs.

For example, it is possible that the size of the row vector output buffer is not large enough. FIG. 13 is a block diagram of an example resizing process of row vector outputs.

After the offloading call is made with the initial allocation for the result, a buffer shortage is detected by the database accelerator. For example, if (capacity-size=<threshold), then the database accelerator returns a vector-resizing-request as a return code.

The vector resizing process can include a request by the database accelerator to request resizing the vector. The in-memory database management system can perform the reallocation. The database accelerator can copy the data from the previous vector. The in-memory database management system can then resume the APIs with new parameters after resizing.

The in-memory database management system can manage the allocation and free allocated memory after use.

The details of such a process can be as follows:
The variable scan_count (number of rows scanned so far) can be set to zero.
The variable size (number of rows in the output array) can be initially set to zero.
The database accelerator scan engines can copy the data in start_ptr1 to atart_ptr2 unless start_ptr1 is null. When copying the data, the number of rows to copy is defined in size The database accelerator scan engines start to scan from [index+scan_count] (inclusive) to [index+count] (exclusive).

The row identifiers of the rows satisfying the predicates can be added from start_ptr2[size] during scan by the database accelerator.

When returning from offloading, the database accelerator returns the number of rows scanned so far in the variable scan_count and the number of rows in the output array in the variable size.

Scanning can be resumed after sufficient allocation is made for the result buffer.

Example 31

Example API: Lookup Database Operation

In any of the examples herein, a database accelerator can process an offloaded lookup database operation. In an in-memory database scenario, lookup can involve decompressing the column vector within a row identifier range specified by the starting offset and the count. The uncompressed value identifiers can then be stored to an array specified by the destination pointer.

An example of a basic implementation of lookup (e.g., mget) is as follows:

```
unsigned mget_offloading_impl(uint64_t index, uint64_t
count, unsigned* dest, Documents* doc)
{
    for (int i = 0 ; i < count; i++)
    {
        dest[i] = doc->get(index + i);
    }
}
``` get( ) can return the uncompressed valueID at the specified index. Processing for get( ) can operate differently depending on whether sparse or indirect compression are used.

Example 32

Example API: Lookup Function Definitions

The function definition for a lookup can vary depending on the scenario:
(1) Lookup for bit-packed compression
int mget_offloading_impl(uint64_t index, uint64_t count,
    unsigned* dest, void* cache,
const unsigned bits, const uint64_t* data, const uint64_t
    mask);
(2) Lookup for sparse compression
int mget_offloading_impl(uint64_t index, uint64_t count,
    unsigned* dest, void* cache,
const SparseMemoryDocumentsWrapper* doc);
(3) Lookup for indirect compression
int mget_offloading_impl(uint64_t index, uint64_t count,
    unsigned* dest, void* cache,
const IndirectMemoryDocumentsWrapper* doc);
The function parameters can be as follows:

| Category | Type | Name | Description |
|---|---|---|---|
| Common | Uint64_t | index | Lookup starting offset of the row ID range |

-continued

| Category | Type | Name | Description |
|---|---|---|---|
| Common | Uint64_t | count | Number of data to look up from the starting offset |
| Common | Unsigned* | dest | the pointer to the allocated array of the value ID output vector (the size is same as count) |
| Common | Void* | cache | Pointer to cache the lookup information for performance optimization |

Example 33

Example API: Lookup in Bit-Packed Compression

Figure 14:
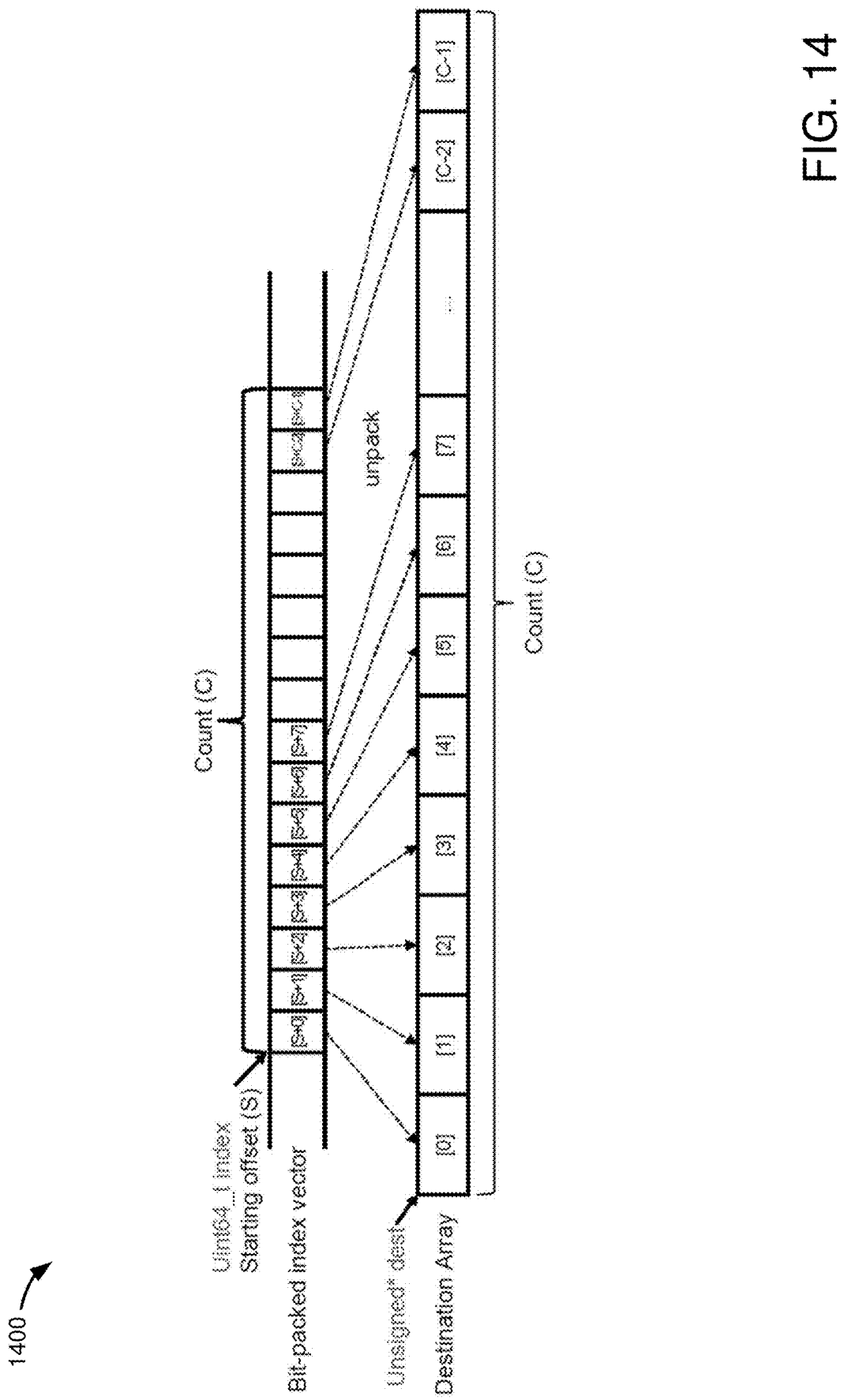
FIG. 14 is a block diagram of an example of bit-packed compression in a lookup database operation.

Lookup can involve source values that have been subjected to bit-packed compression. To process the lookup, the database accelerator can unpack the vector within the range and store the value identifiers to the destination array. FIG. 14 is a block diagram of an example of bit-packed compression in a lookup database operation. Additional parameters for the lookup database operation can be provided as follows:

| Category | Type | Name | Description |
|---|---|---|---|
| Bit-packed compression | Const unsigned | bits | Number of bits per value in the bit-packed index vector |
| Bit-packed compression | Const uint64_t* | data | Pointer to the input data buffer of the bit-packed index vector |
| Bit-packed compression | Const uint64_t | mask | Mask value for the input vector (same as (1 << bits) − 1) |

Example 34

Example API: Lookup in Sparse Compression

Lookup can involve source values that have been subjected to sparse compression. The input parameters can involve a type adjustment for such advanced compression. A SparseMemoryDocumentsWrapper structure can be as follows:

| Type | Name | Description |
|---|---|---|
| Unsigned | itsValueCount | Number of distinct values= |
| Int | itsZeroValue | ValueID of the most frequent values |
| Uint64_t* (BitVector) | itsNonZeroDocument | A list of 1-bit values indicating whether it is zero-value or not |
| Int | itsZeroOffset | Number of prefix with the zero-value (multiple of 128) |
| Uint64_t* (IndexVector) | itsNonZeroValues | Bit-packed nonzero values (a.k.a. nonzero vector) |
| Unsigned | bitsNonZeroValues | Number of bits per value in itsNonZeroValues |
| Uint64_t* (IndexVector) | itsPositions | Bit-packed values indicating the starting position of the nonzero vector per group of 128 values |
| Unsigned | bitsPositions | Number of bits per value in itsPositions |

Such a structure can mirror the underlying structure of the in-memory database management system, with added fields for bitsNonZeroValues and bitsPositions as shown. Such a class-wise data structure can be flattened with primitive types.

The class members in the data structure can include the following:

itsValueCount, which contains the number of distinct values;

itsZeroValue, which contains the valueID of the most frequent values;

itsNonZeroDocuments, which is a list of one-bit values indicating the value is non-zero (not the most frequent one) if set of the value is zero (the most frequent one) otherwise;

itsNonZeroValues (a/k/a nonzero vector), which is bit-packed non-zero values (all but the most frequent one) and number of bits per values: same as that in the bit-packed compressed data before the sparse compression;

itsPositions, which is a bit-packed vector of values indicating the starting position of the nonzero vector per group of 128 values and the number of bits per values: dependent on the number of data items in the column vector (not dependent on the size of nonzero vector [itsNonZeroValues]. For example, number bits per values is 31 if the number of data items is 2,000,000,000); and itsZeroOffset, which contains the number of prefix values with the zero value (multiple of 128).

Figure 15:
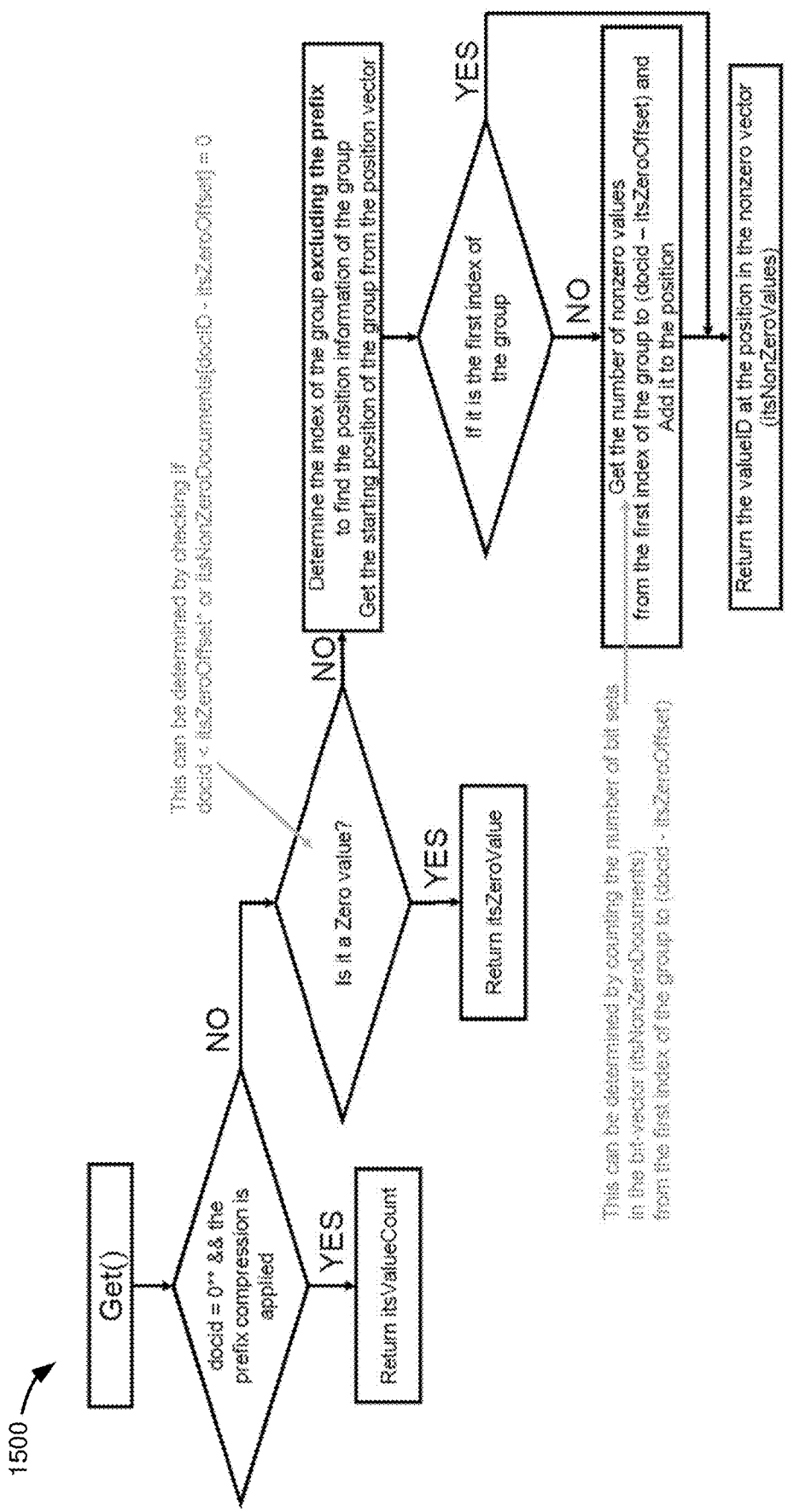
FIG. 15 is a flowchart of an example method of a lookup database operation in a sparse compression scenario.

FIG. 15 shows an example method 1500 of lookup in a sparse compression scenario. In the example, itsZeroOffset is a multiple of the group size (128) in the sparse compression. docid=0 is reserved even if prefix compression is applied.

Example 35

Example API: Lookup in Sparse Compression Pseudo Code

Lookup in a sparse compression scenario can be implemented by the following pseudo code:

```
Get(int docID)
    If docID = 0 && itsZeroOffset > 0 then // if docid = 0 &&
prefix compression is applied
        Return itsValueCount // docID = 0 is reserved to represent
the number of distinct values
    Else if docID < itsZeroOffset | | itsNonZeroDocuments[docID −
itsZeroOffset] = 0 // if it is zero value
        Return itsZeroValue
    Else
        GROUP_INDEX = (docID − itsZeroOffset) / 128
        FIRST_INDEX = GROUP_INDEX * 128
        POSITION = itsPositions[GROUP_INDEX]
        If FIRST_INDEX < (docID − itsZeroOffset) then
            POSITION += {The number of bit sets in itsNonZeroDocuments
from FIRST_INDEX to (docID − itsZeroOffset)}
        Return itsNonZeroValues[POSITION]
```

Example 36

Example API: Lookup in Indirect Compression

Figure 16:
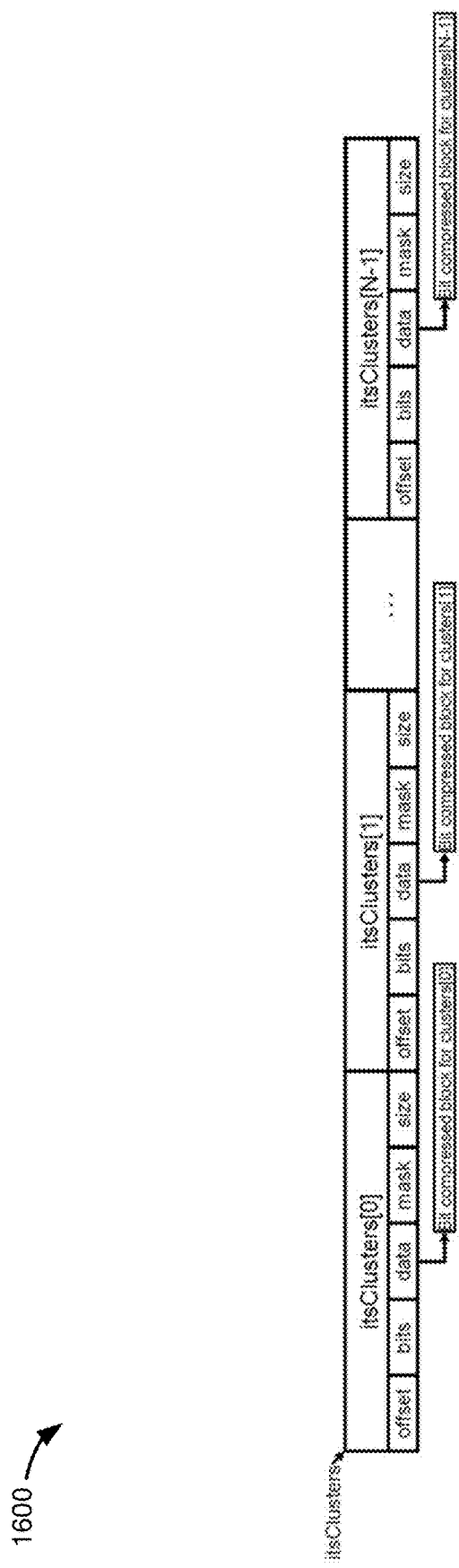
FIG. 16 is a block diagram showing a lookup database operation in an indirect compression scenario.

Lookup can involve source values that have been subjected to indirect compression. To process the lookup, the database accelerator can perform decompression as appropriate. FIG. 16 is a block diagram showing a lookup database operation in an indirect compression scenario.

An IndirectMemoryDocumentsWrapper structure can be as follows:

| Type | Name | Description |
|---|---|---|
| Int | itsZeroValue | Number of distinct values |
| Int | itsPrefixValue | Value at the docid = 1 (if prefix compression is applied) |
| Int | itsPrefixOffset | Number of prefix values (multiple of 1024) |
| Uint64_t* (IndexVector) | itsValues | Cluster dictionaries or uncompressed clusters |
| Unsigned | bitsValues | Number of bits per value in itsValues |
| IndBlockInfosWrapper* (vector <IndBlockInfos>) | itsClusters | Pointer to an array of the wrapper of the information of clusters |

Such a structure can mirror the underlying structure of the in-memory database management system, with an added field for bitsValues as shown. Such a class-wise data structure can be flattened with primitive types.

The wrapper for IndBlockInfos can be as follows:

```
struct IndBlockInfosWrapper {
  int offset; // from IndBlockInfos::offset
  unsigned bits; // from IndBlockInfos::ind::m_bitsPerValue,
  set to 32 if the cluster is uncompressed
  uint64_t* data; // from IndBlockInfos::ind::m_buffer, set to
  nullptr if the cluster is uncompressed
};
```

The class members in the data structure can include the following:
 itsValues: a bit-packed vector containing cluster dictionaries if applied or uncompressed clusters otherwise; the number of bits per values: same as that in the bit-packed compressed data before the indirect compression
 itsClusters: IndBlockInfos::offset: the start index of the index vector (itsValues) for each cluster; IndBlockInfos::ind: bit-compressed block of the compressed cluster if applied (number bits per values is 0~10 depending on the number of distinct values in each cluster; if number bits per values=0, the valueID of the rows in the clusters are the same
 itsZeroValue: contains the number of distinct values
 itsPrefixValue: contains the value at the docid=1 (0 is reserved) if prefix compression is applied
 itsPrefixOffset: contains the number of prefix values with the prefix value (multiple of 1024).

Figure 17:
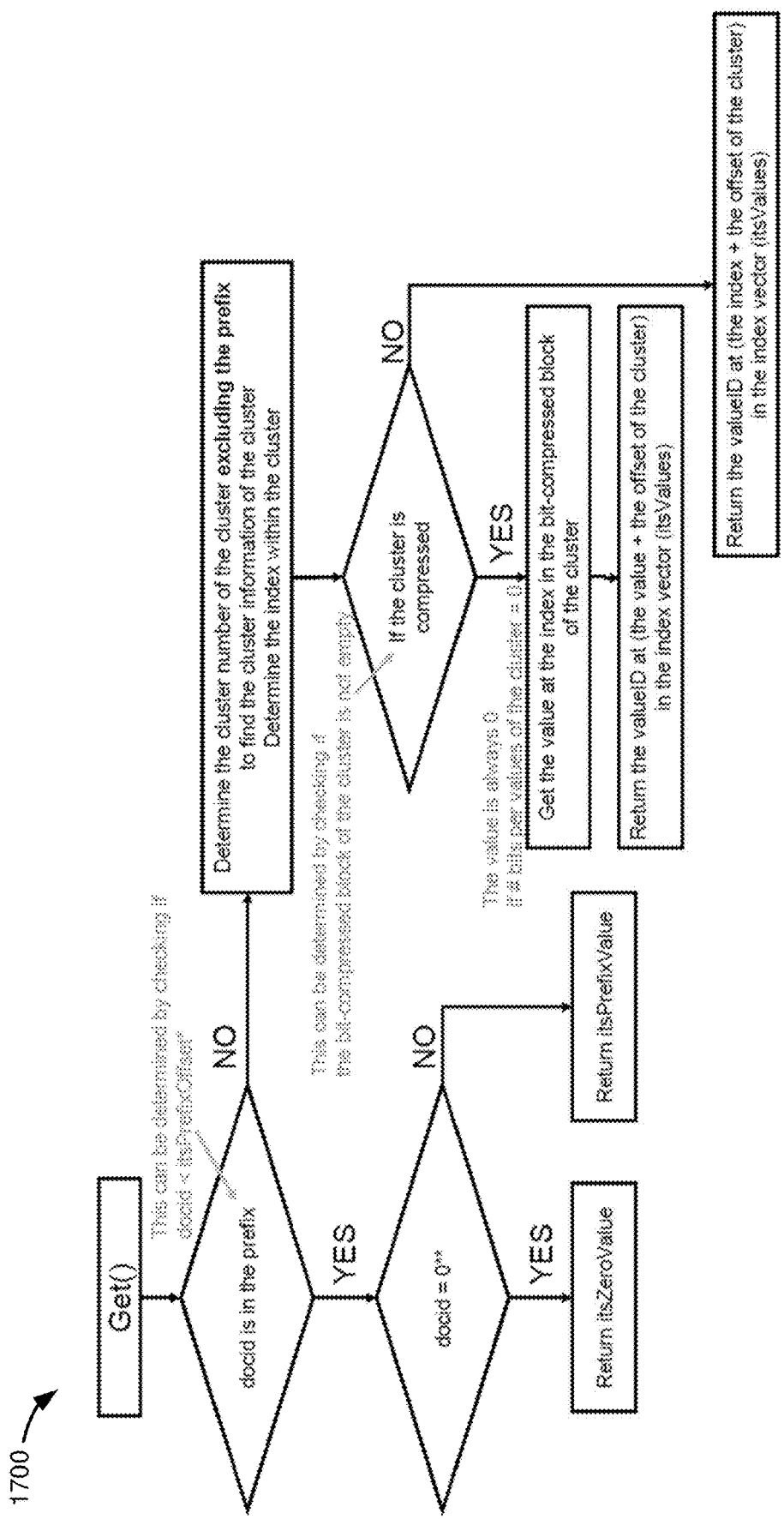
FIG. 17 is a flowchart of an example method of a lookup database operation in an indirect compression scenario.

FIG. 17 shows an example method 1700 of lookup in an indirect compression scenario. In the example, itsPrefixOffset is a multiple of the cluster size (e.g., 1024) in the indirect compression. docid=0 is reserved even if prefix compression is applied.

Example 37

Example API: Lookup in Indirect Compression Pseudo Code

Lookup in an indirect compression scenario can be implemented by the following pseudo code:

```
Get(int docID)
  If docID < itsPrefixOffset then // if docID is in the prefix
    If docID = 0 then return itsZeroValue // docID = 0 is
``` reserved to represent the number of distinct values
    Else return itsPrefixValue // Otherwise the value is the prefix
  Else
    CLUSTER_INDEX = (docID − itsPrefixOffset) / 1024
    INDEX = (docID − itsPrefixOffset) − CLUSTER_INDEX * 1024
    BLOCKINFO = itsClusters[CLUSTER_INDEX]
    If BLOCKINFO.ind.empty( ) = false then // if the cluster is compressed
      INDEX = BLOCKINFO.ind[INDEX] // Get the index for the cluster dictionary
    Return itsValues[BLOCKINFO.offset + INDEX] // INDEX becomes 0 if # bits per values of the cluster = 0

Example 38

Example Data Compression for in-Memory Database Management System

In any of the examples herein, an in-memory database management system can implement compression when storing data in-memory, and such data can be source values for a database accelerator that executes a database operation on the data as stored in memory. As described herein, a variety of compression schemes can be supported. The in-memory database management system can track which database elements are using which types of compression. Column stores can utilize advanced compression techniques to represent a large number of values in a smaller memory footprint.

Example 39

Figure 18:
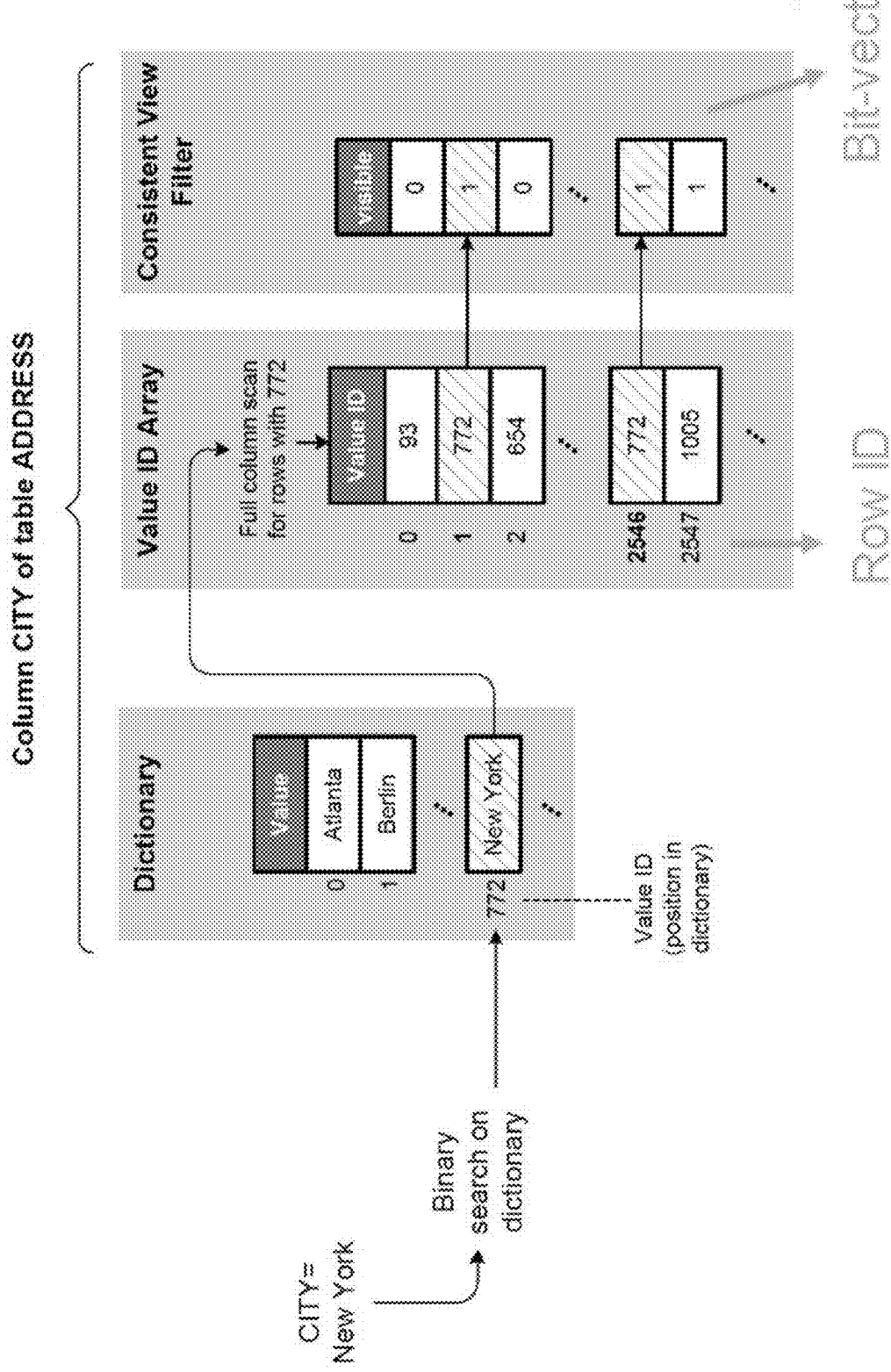
FIG. 18 is a block diagram of data structures for use in bit-packed compression of database components in an in-memory database management system.

Example Data Compression for in-Memory Database Management System: Bit-Packed Compression A bit-packed compression scheme can be used by default. FIG. 18 is a block diagram of data structures 1800 for use in bit-packed compression of database components in an in-memory database management system.

In the example, column data is stored by a dictionary and a ValueID Array. ValueID arrays can be compressed to save memory usage. So, in practice, bit-packed compression can be used in concert with additional compression schemes as described herein (e.g., sparse, clustered, run-length encoding, indirect, or the like).

Figure 19:
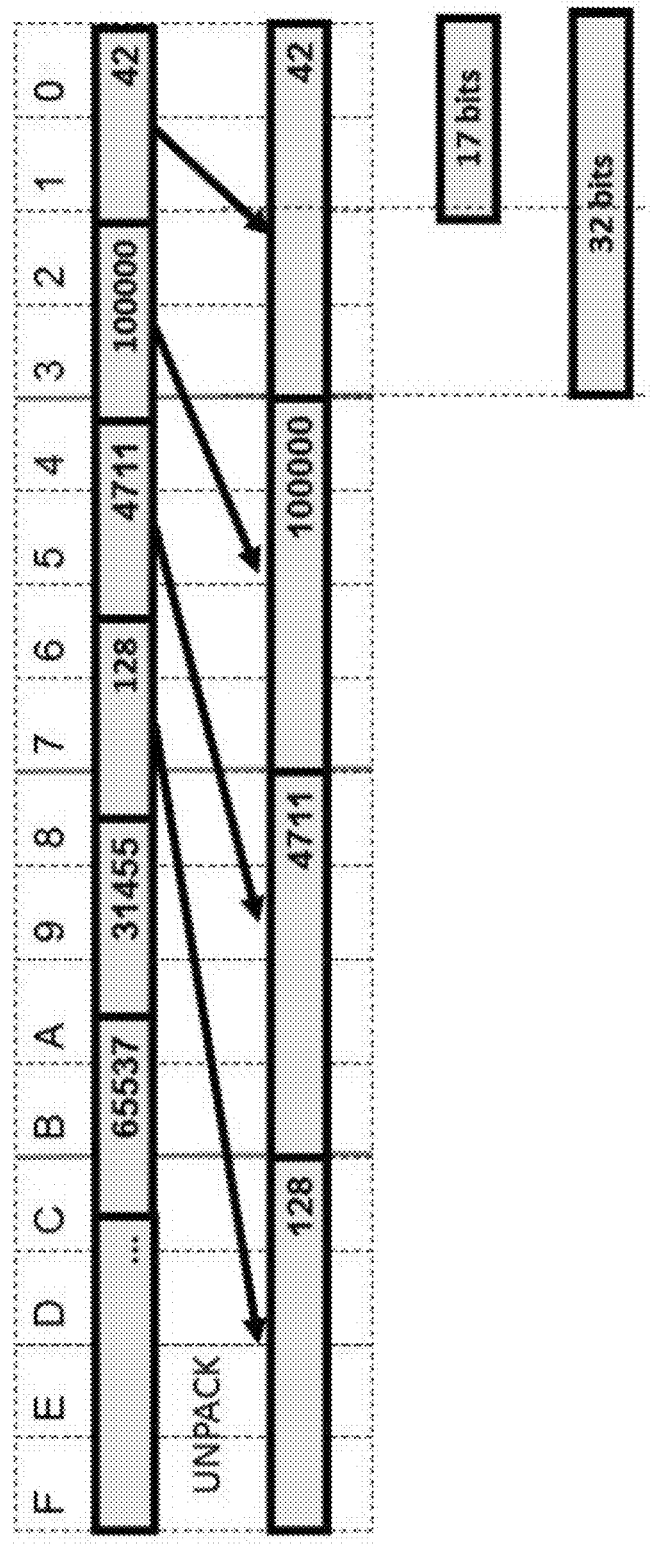
FIG. 19 is a block diagram of bit-packed (i.e., compressed) ValueID arrays.

FIG. 19 is a block diagram of bit-packed (i.e., compressed) ValueID arrays. Only meaningful bits need to be used to keep the values. In the example, a value may be stored in a smaller number of bits (e.g., which need not align with a byte boundary, such as 17 bits in the example) than when unpacked (e.g., which typically does align with a byte boundary, such as 32 bits in the example). The number of bits can be tracked by the in-memory database and provided as a parameter to the database accelerator to facilitate decompression.

In-Memory Database Management System: Column Store Compression

Figure 20:
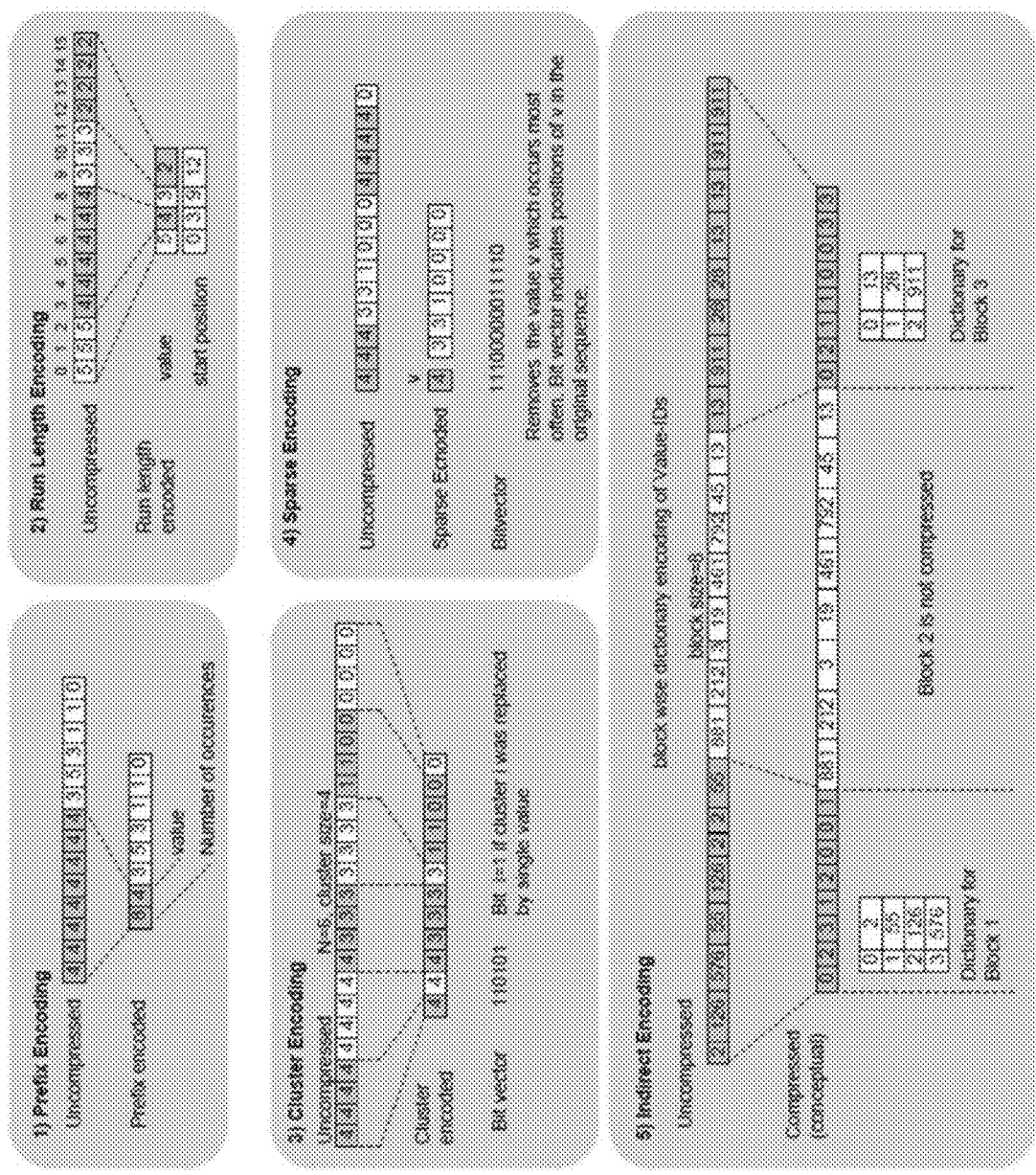
FIG. 20 is a block diagram showing different column store compression scenarios.

As described herein, a variety of compression schemes can be used for column stores. Such compression can be used on the ValueID arrays of the main storage. A separate delta store can also be maintained, and the compressed result can be computed and executed during a delta merge when the delta store is merged with the main storage (e.g., in a merging operation). FIG. 20 is a block diagram showing different column store compression scenarios 2000: prefix encoding, run length encoding, cluster encoding, sparse encoding, and indirect encoding. A database accelerator can be configured to perform database operations on source data in any of the compressed formats. Therefore, multiple-compression-scheme-aware database accelerators can be implemented.

Prefix encoding: If the column starts with a long sequence of the same value V, the sequence is replaced by storing the value once, together with the number of occurrences. This makes sense if there is one predominant value in the column and the remaining values are mostly unique or have low redundancy.

Run length encoding replaces sequences of the same value with a single instance of the value and its start position. This variant of run length encoding was chosen, as it speeds up access compared to storing the number of occurrences with each value.

Cluster encoding partitions the array into N blocks of fixed size (e.g., 1024 elements). If a cluster contains only occurrences of a single value, the cluster is replaced by a single occurrence of that value. A bit vector of length N indicates which clusters were replaced by a single value.

Sparse encoding removes the value V that appears most often. A bit vector indicates at which positions V was removed from the original array.

Indirect encoding is also based on partitioning into blocks of 1024 elements. If a block contains only a few distinct values, an additional dictionary is used to encode the values in that block. The figure illustrates the concept with a block size of 8 elements. The first and the third block consist of not more than 4 distinct values, so a dictionary with 4 entries and an encoding of values with 2 bits is possible. For the second block this kind of compression makes no sense. With 8 distinct values the dictionary alone would need the same space as the uncompressed array. The implementation also needs to store the information which blocks are encoded with an additional dictionary and the links to the additional dictionaries.

In-Memory Database Management System: Sparse Compression

Figure 21:
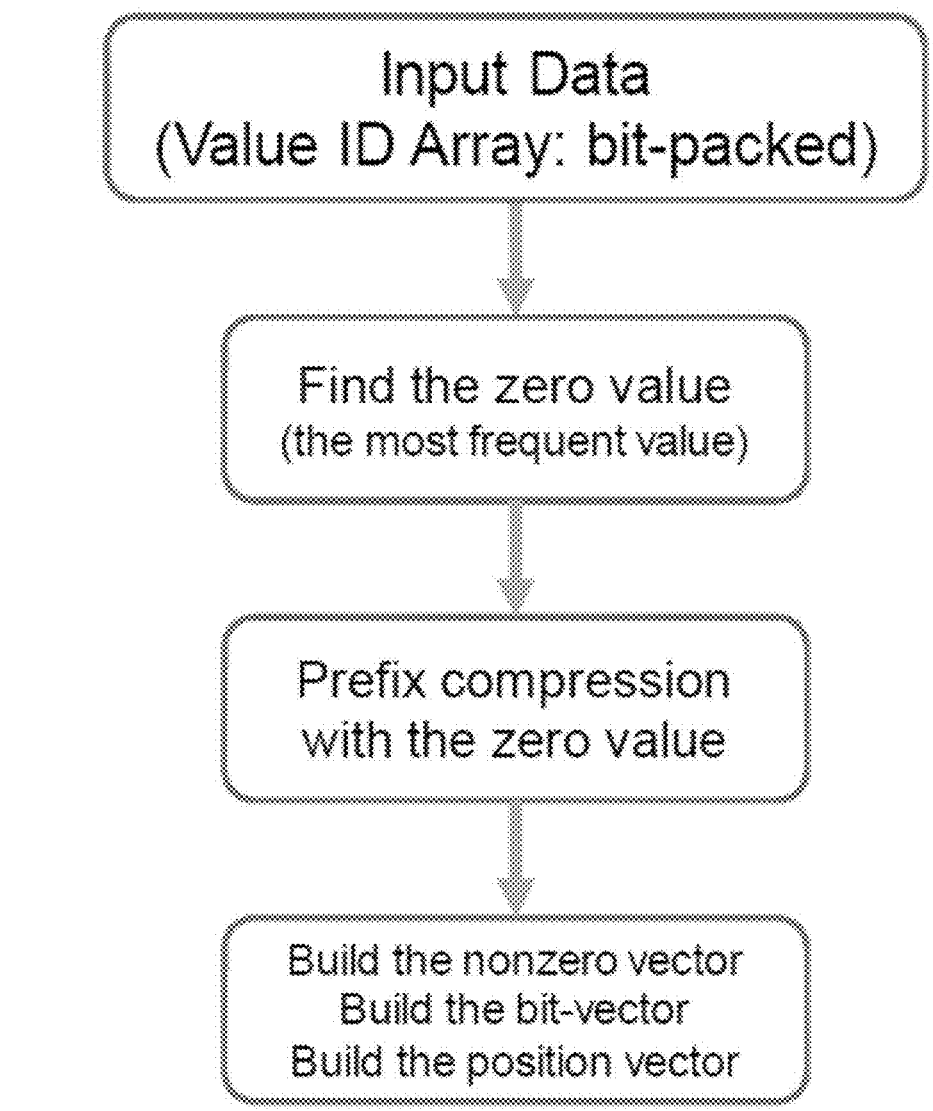
FIG. 21 is a flowchart of an example method of sparse compression for use in an in-memory database management system.

FIG. 21 is a flowchart of an example method 2100 of sparse compression for use in an in-memory database management system. At the end, the IndexVector itsNonZeroValues contains non-zero values (e.g., all but the most frequent one) which is also known as a nonzero vector. The BitVector itsNonZeroDocuments contains a list of one-bit values indicating whether the value is zero or non-zero. The IndexVector itsPositions is a bit-packed vector of values indicating the starting position of the nonzero vector per group of (e.g., 128) values.

A condition is that the zero value (most frequent value) needs to be found. The compression can also apply prefix compression of the zero value (e.g., SpDocuments:itsZeroOffset [aligned by 128]).

A first example walkthrough with prefix, assuming position granularity of 4 is as follows:
Input: (3),0,0,0, 0,1,2,1, 1,1,1,1, 1,1,2,2, 2,2,2,2, 0,0,0,1, 0,0,0,0, 1,1,1,1, 1,1,1,1, 0,1,2,0, 0,0,0,0, 0
Zero value: 0
Zero offset: 4
Nonzero vector: 1,2,1, 1,1,1,1, 1,1,2,2, 2,2,2,2, 1, 1,1,1,1, 1,1,1,1, 1,2
Bit-vector: 0,1,1,1, 1,1,1,1, 1,1,1,1, 1,1,1,1, 0,0,0,1, 0,0, 0,0, 1,1,1,1, 1,1,1,1, 0,1,1,0, 0,0,0,0, 0
Positions: 0, 3, 7, 11, 15, 16, 16, 20, 24, 26, 26

When applying the prefix compression, docID=0 is ignored because it is reserved.

The number of bits in the bit-vector matches the size of data excluding the prefix.

The number of values in the position vector matches the number of groups without the prefix.

A second example walkthrough without prefix, assuming position granularity of 4 is as follows:
Input: (3),0,0,0, 0,1,2,1, 1,1,1,1, 1,1,2,2, 2,2,2,2, 0,0,0,1, 0,0,0,0, 1,1,1,1, 1,1,1,1, 0,1,2
Zero value: 1
Zero offset: 0
Nonzero vector: (3),0,0,0, 0,2, 2,2, 2,2,2,2, 0,0,0, 0,0,0,0, 0,2
Bit-vector: 1,1,1,1, 1,0,1,0, 0,0,0,0, 0,0,1,1, 1,1,1,1, 1,1, 1,0, 1,1,1,1, 0,0,0,0, 0,0,0,0, 1,0,1
Positions: 0, 4, 6, 6, 8, 12, 15, 19, 19, 19

No prefix compression because the values are not the zero values except the value at docid=0.

Figure 22:
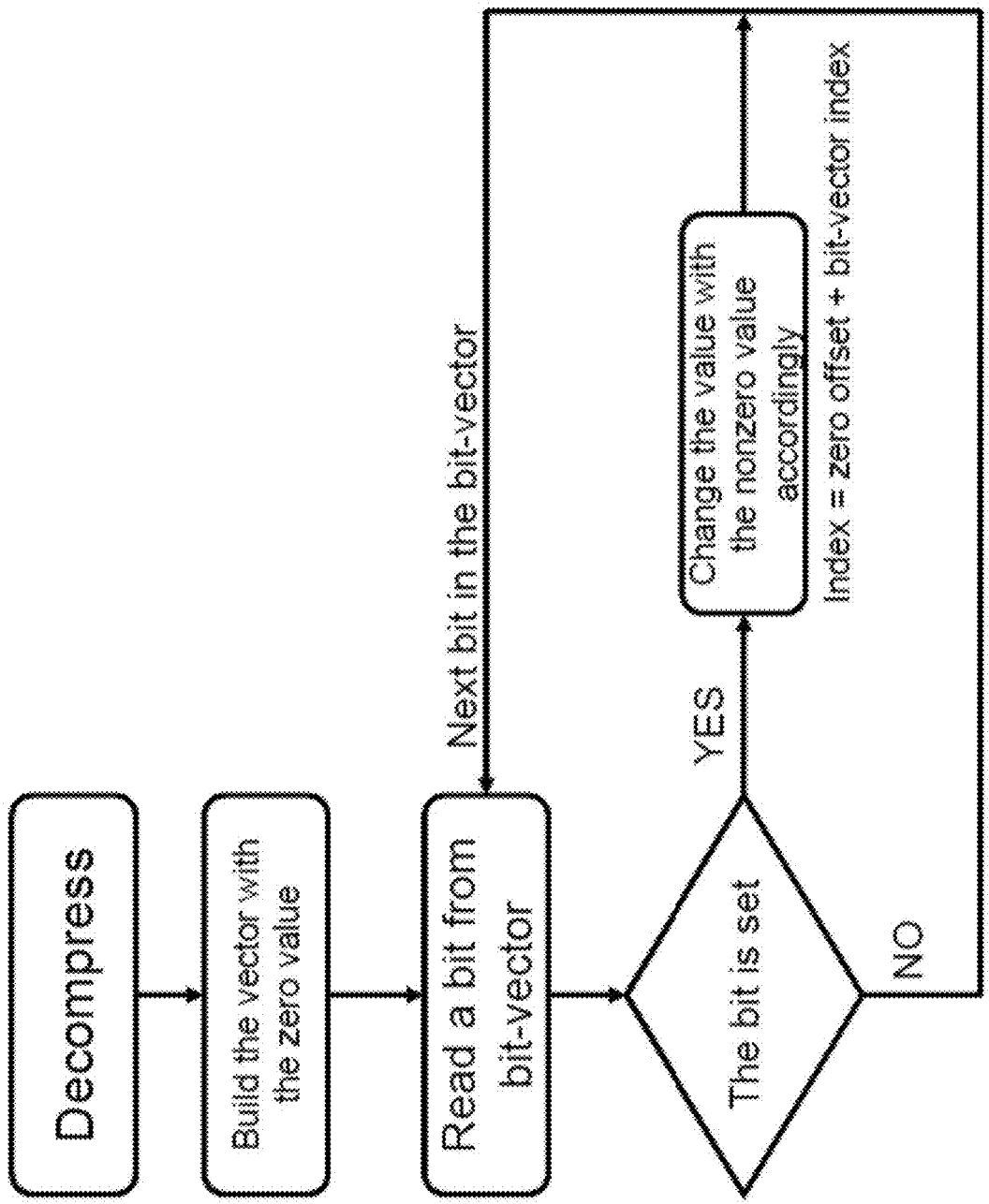
FIG. 22 is a flowchart of an example method of sparse decompression for use in an in-memory database management system.

FIG. 22 is a flowchart of an example method 2200 of sparse decompression for use in an in-memory database management system.

In-Memory Database Management System: Indirect Compression

Figure 23:
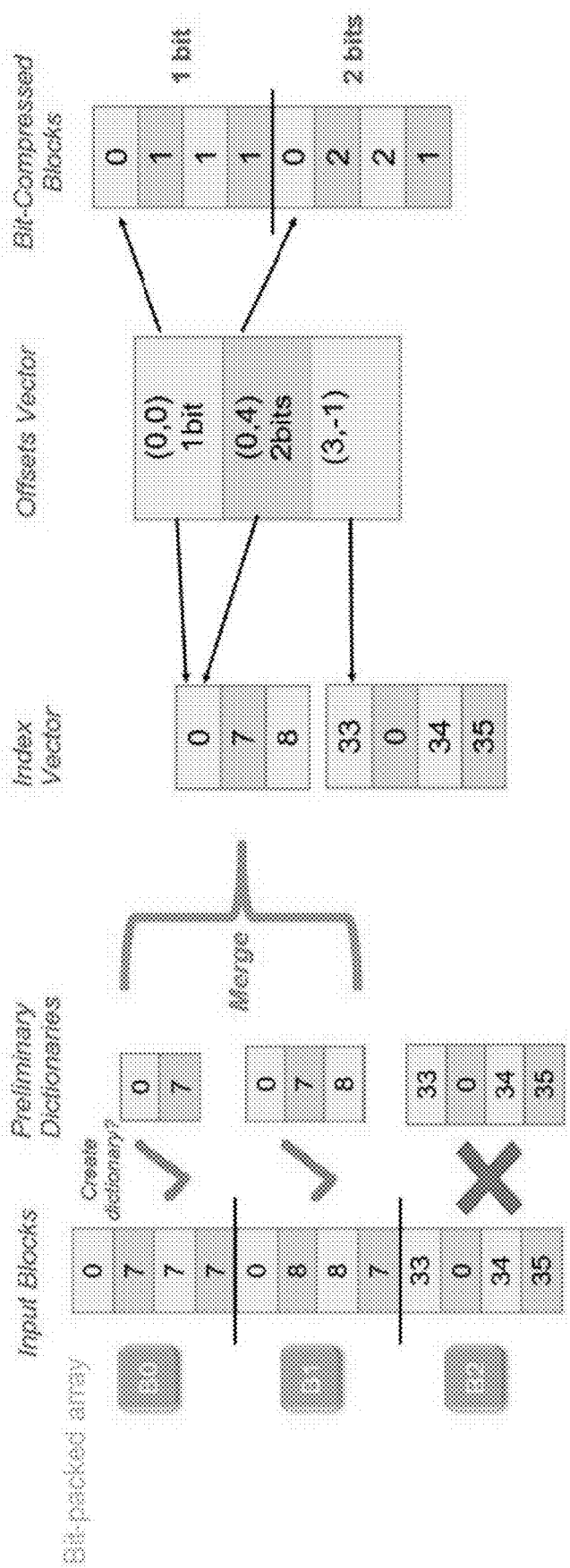
FIG. 23 is a block diagram of an example of an indirect compression technique for use in an in-memory database management system.

In any of the examples herein, indirect compression can also be used on value identifiers. FIG. 23 is a block diagram of an example of an indirect compression technique 2300 for use in an in-memory database management system. The Index Vector contains the new dictionaries and, for the blocks that were not compressed, the original values.

The bit-compressed blocks are formed as follows: each block is re-encoded using the indexes of the dictionary and then bit-compressed, which is then stored in the bit-compressed blocks vector, sequentially.

Offsets Vector: for each block, a structure keeps record of the following information: where the data related to the block starts in the Index Vector, where it starts in the Bit-Compressed Blocks vector if that is the case, and how many bits were used to encode it.

Figure 24:
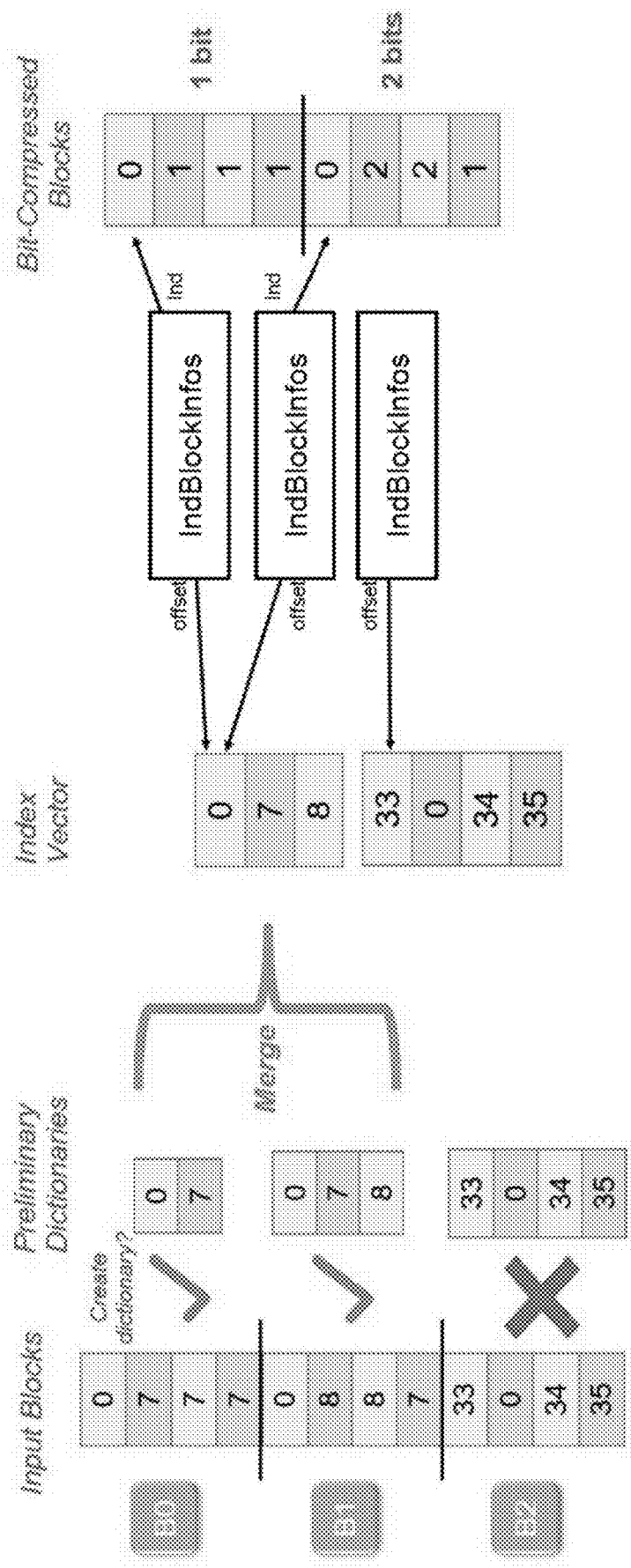
FIG. 24 is another block diagram of an example of an indirect compression technique for use in an in-memory database management system.

FIG. 24 is another block diagram of an example of an indirect compression technique 2400 for use in an in-memory database management system.

An example of indirect compression without prefix, assuming the size of the cluster=8, is as follows:
Input: (7),0,0,1,0,0,1,0, 0,1,1,1,2,1,1,1, 0,2,2,1,2,2,2,3, 4,0,5,6,3,4,5,2, 2,4,2,2,4,2,4,2
Prefix value: 0
Prefix offset: 0
IndexVector: (7),0,1,2, 0,2,1,3, 4,0,5,6,3,4,5,2, 2,4
Vector of IndBlockInfos
[0].offset=0, [0].ind=0,1,1,2,1,1,2,1 (2-bit)
[1].offset=0, [1].ind=1,2,2,2,3,2,2,2 (2-bit)
[2].offset=4, [2].ind=0,1,1,2,1,1,1,3 (2-bit)
[3].offset=8, [3].ind=empty (uncompressed)
[4].offset=16, [4].ind=0,1,0,0,1,0,1,0 (1-bit)

There is no prefix compression because not all values are same in the cluster except the value at docid=0.

Figure 25:
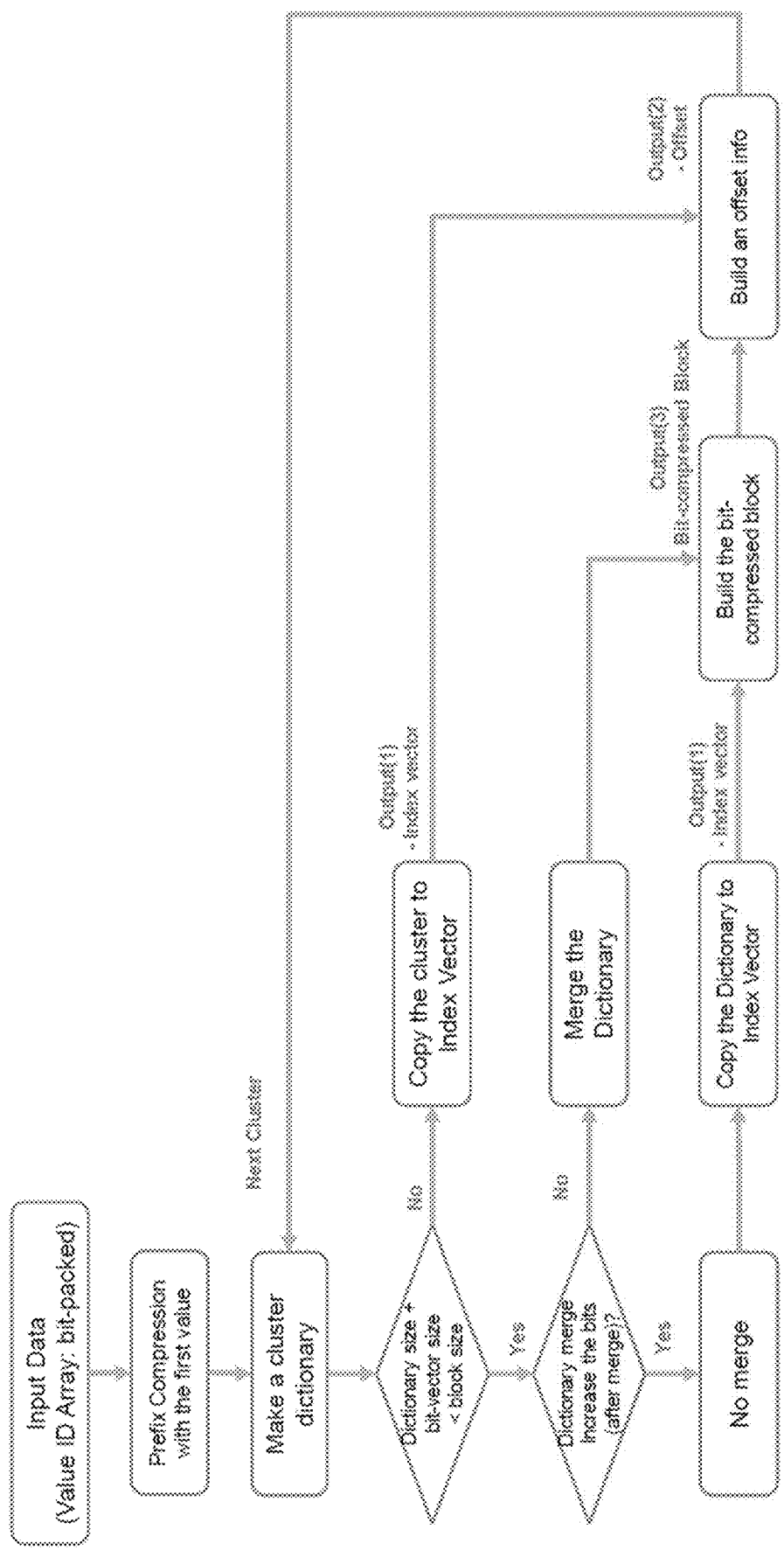
FIG. 25 is a flowchart of an indirect compression method for use in an in-memory database management system.

FIG. 25 is a flowchart of an indirect compression method 2500 for use in an in-memory database management system.

For indirect compression, the outputs are as follows:
an IndexVector containing
Cluster dictionaries if applied or uncompressed clusters of the column vector otherwise; and
a Vector of IndBlockInfos
IndBlockInfos::offset—The start index of the index vector for each cluster
IndBlockInfos::ind—Bit-compressed block of the compressed clusters if applied (IndexVector).

A condition for the indirect compression is that the size of the cluster dictionary plus the size of the bit-compressed block should be smaller for each cluster.

Prefix compression of the first value can also be applied, using IndDocuments::itsPrefixValue and IndDocuments::itsPrefixOffset (e.g., aligned by 1024)

Figure 26:
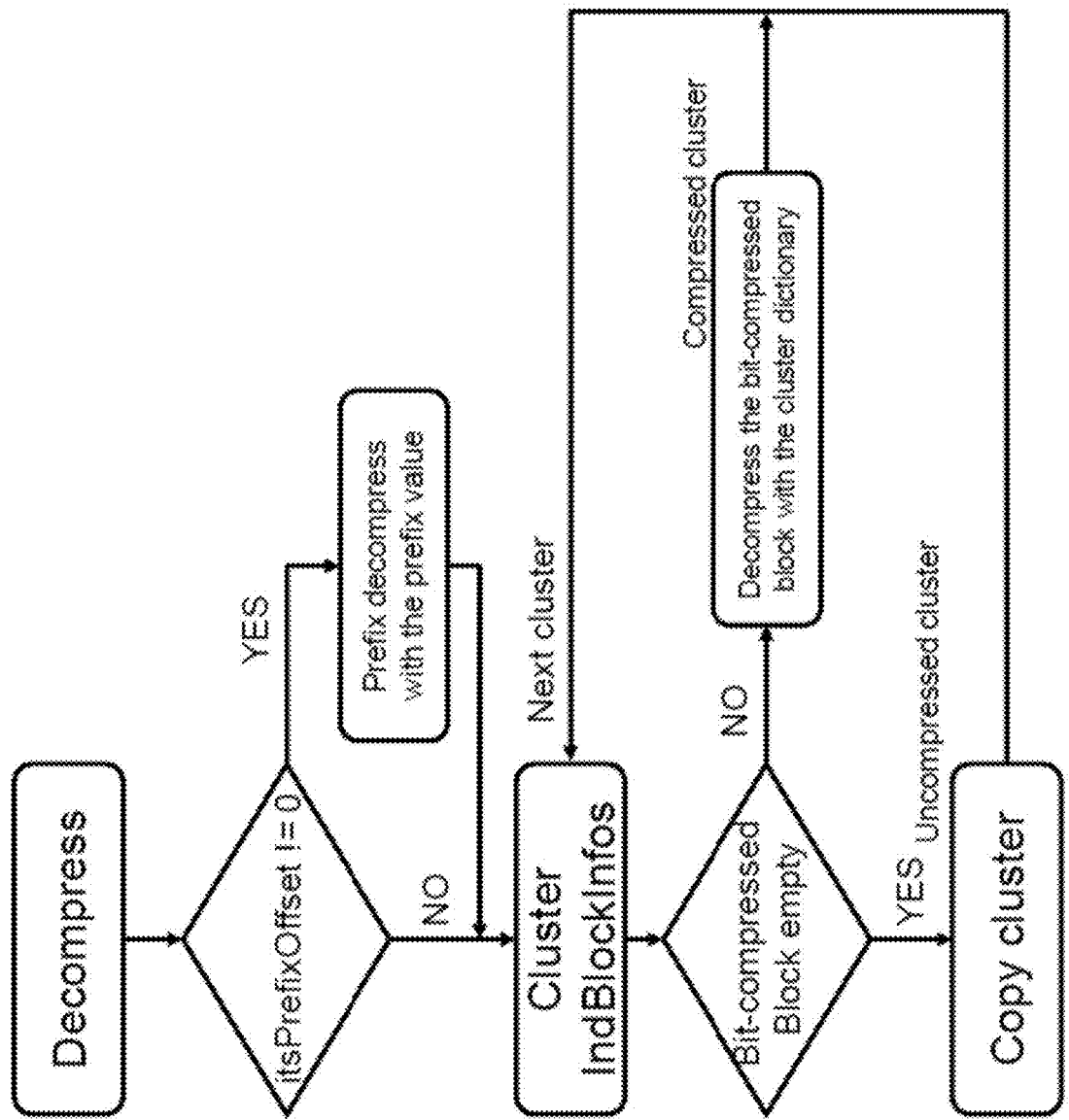
FIG. 26 is a flowchart of an indirect decompression method for use in an in-memory database management system.

FIG. 26 is a flowchart of an indirect decompression method for use in an in-memory database management system. The following can be used:
writePtr[i]=clusterDict[clusterBuffer[i]];

In-Memory Database Management System: Cluster Dictionary

A database accelerator can also perform database operations on values that involve a cluster dictionary as part of indirect compression. A cluster dictionary can take the form of a vector of distinct values in each cluster and a list of mapped indexes in the vector to help find the value in the vector.

The properties of the cluster dictionary are the values in the cluster dictionary are integer valueIDs and they are unordered to avoid rebuilding the previous bit-compressed block when the cluster dictionaries are merged.

A resulting condition of merging is that the bit widths of the numbers of distinct values are the same between the previous and the next. It can be additionally accepted when $n=2^{(k-1)}$, where k is the bit width. Also, the number of additional distinct values in the next cluster dictionary does not require any additional bits.

During a merging operation, the additional distinct values are appended into the previous cluster dictionary. The bit-compressed block of the current cluster can be rebuilt based on the merged dictionary.

FIG. 27 is a block diagram of cluster dictionary processing in indirect compression for use in an in-memory database management system.

Example 40

Example Performance Degradation of Conventional Approaches

Figure 28:
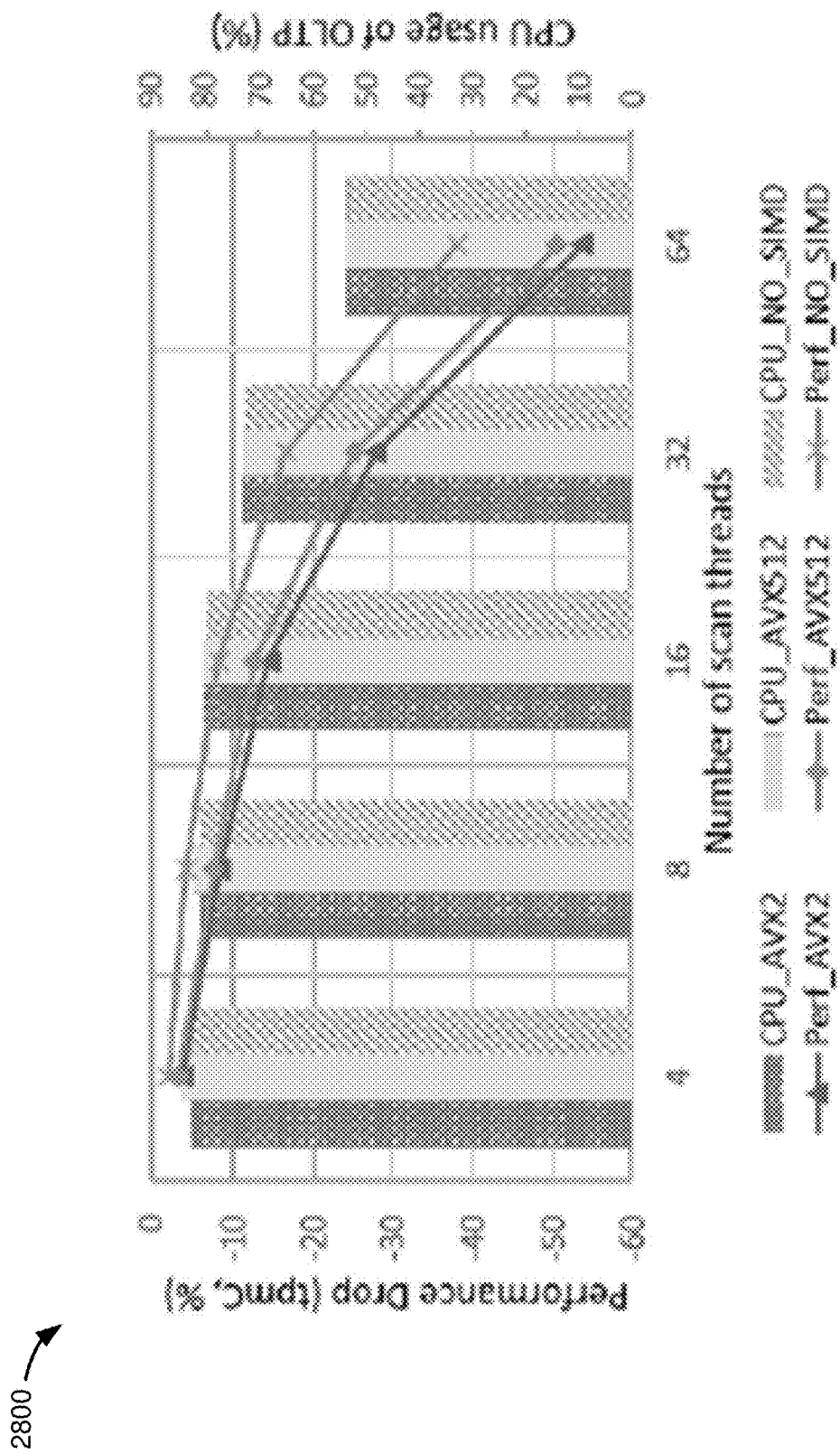
FIG. 28 is a bar chart showing online transaction processing (OLTP) throughput variation by increased scans.

FIG. 28 shows the performance degradation of online transaction processing (OLTP) workload by the interference from the scan workloads on online analytical processing (OLAP) data in the server having 4 sockets and 72 physical cores. The two workloads managed by two separate processes access the different sets of data but compete with each other due to limited hardware resources like CPU, cache and memory bandwidth. As the number of scan threads increases, the CPU resources allocated for OLTP workloads are reduced, thus the throughput of OLTP workloads decreases.

One can apply SIMD (single instruction, multiple data) instructions to data-intensive operations like scan within a DBMS because SIMD performs the same operation on multiple data points simultaneously exploiting data level parallelism. One can observe that the OLTP workloads show a larger performance degradation, when the scan operation is implemented with SIMD commands like AVX2 or AVX 512 because of much higher memory bandwidth usage. As shown in Table 1, 64 scan threads consume almost all memory bandwidth of 4 sockets with SIMD, only 12% of memory bandwidth is consumed without SIMD. Interestingly, there is no difference in CPU usage between SIMD and NO-SIMD, but the OLTP throughput shows a larger performance degradation with SIMD. In FIG. 1, with 64 scan threads, the CPU usage by OLTP decreased by 30% but the OLTP throughput decreases by about 40% without SIMD and more than 50% with SIMD. This supports the claim that the larger memory bandwidth usage by data-intensive workloads degrades OLTP performance more.

TABLE 1

| # Threads | memory bandwidth usage (%) by scan workloads | | |
|---|---|---|---|
| | AVX2 | AVX512 | No_SIMD |
| 4 | 11.3 | 6.0 | 0.8 |
| 8 | 21.8 | 12.3 | 1.3 |
| 16 | 41.3 | 23.0 | 2.8 |
| 32 | 73.8 | 46.3 | 5.5 |
| 64 | 94.8 | 85.3 | 11.3 |

Example 41

Example Scan Operation in In-Memory Database Management Systems (IMDBMS)

Recent in-memory database management systems can be designed to support both OLTP and OLAP workloads and keep the data in columnar storage for fast read accesses of the tables, storing the majority of data of each column in the read-optimized main storage, and maintaining separate delta storage for optimized writes. The delta storage is periodically merged to the main storage. To reduce the memory footprint (or total cost of ownership), the main storage uses dictionary encoding where the distinct values are stored in the dictionary and the individual values are replaced with the corresponding value IDs of the dictionary separately with the bit-packed compression. A scan in an IMDBMS reads this value ID array with filter conditions. In the described examples herein, the two common scan operations: Range search (having from/to filter conditions) and inlist search (having a list of filtered values) can be offloaded to the database accelerator because they are simple and common data-intensive operations that often consume relatively high CPU usage (5-10% by itself). They include the decompression of value ID (integer) array and return row IDs satisfying the predicates. Offloading only low-level data access operators in the query plans reduces the effort to integrate them with the existing query optimizer.

Example 42

Example Database Accelerator Architecture: FPGA

Figure 10:
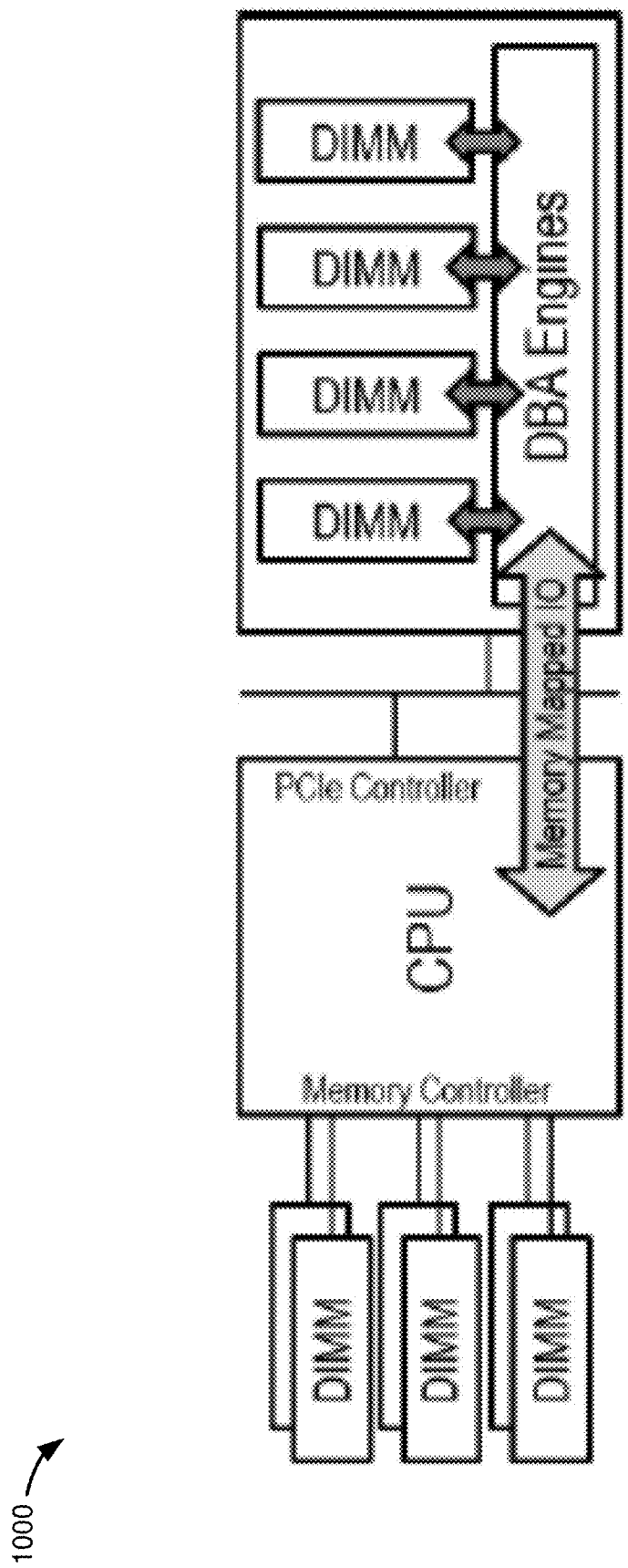
FIG. 10 is a block diagram showing architecture of a proposed system to measure performance of a near-memory database accelerator.

The architecture of a proposed system to measure performance of near-memory database accelerator is shown in FIG. 10. The example demonstrates the offloading feasibility within a current ecosystem, provides a framework to measure stand-alone database accelerator engine performance, and enables study of the system impact of the technology. To remove unnecessary data movement, database operations are performed by the database accelerator in the device memory where the source data is stored. After the database accelerator completes the operations, the result output is written back to the device memory in an FPGA. The host has access to the device memory via memory mapped I/O (MMIO). This eliminates speed and coherency limitations of the PCIe interface from the study and yet leverages the current driver software stack with the OS and the application.

FIG. 11 illustrates an example database accelerator FPGA micro-architecture with functional partitions of host interface 1120, multiple DBA kernels 1130, and a memory subsystem 1140. The host interface 1120 exposes database accelerator control parameters to the driver 1105 that manages offloading from the application API call to the hardware accelerator. A given database accelerator kernel 1130 can comprise a data prefetcher 1132 reading the data, an SIMD engine 1134 comparing the data with the predicate, and a result handler 1136 writing the results. The memory subsystem 1140 provides the infrastructure to access device memories 1160A-N on the FPGA.

Internally, the database accelerator kernels 1130 can read bit-compressed source data (e.g., a block at a time, such as 64B) from the memory 1160A-N. A programmable extractor logic can split the source data into multiple values. The multiple values can be fed into an array of simple processing units and each unit can perform a simple comparison independently. The number of parallel units in the array can be determined by the number of values in the block of data so that the database accelerator kernels can keep up with the input data rate. Compared to fixed length instruction-based processors, the database accelerator kernels can take the full advantage of parallelism in the data stream due to the flexibility of hardware design. The results are packed into blocks (e.g., 64B) and written back to the device memories. Thus, the data flow can be highly optimized for available memory bandwidth.

FIGS. 5 and 8 illustrate an example database accelerator software architecture. Unlike GPU/FPGA accelerators, the database accelerator engine is located within memory devices. Hence, it allows zero data copy with performance and energy gains. The database accelerator device driver assigns one database accelerator engine to a thread of the in-memory database management system application per request. Once offloaded, a thread that requested offloading yields to free the central processing node for processing. When offloading is done, the database accelerator driver wakes up the requester to resume.

Normally, applications use a virtual address (VA) to access memory in the host system while the database accelerator engines access memory with a device physical address (DPA). This implies that the DBA driver is responsible to translate all VA parameters of an offloading request into DPA. The database accelerator driver first obtains the corresponding system physical address (SPA) by referring to a page table. Then, converting DPA to SPA is trivial because system BIOS has stored the start SPA of device memory in BAR registers of the PCI device at boot time.

Example 43

Evaluation: Example Setup

Figure 29:
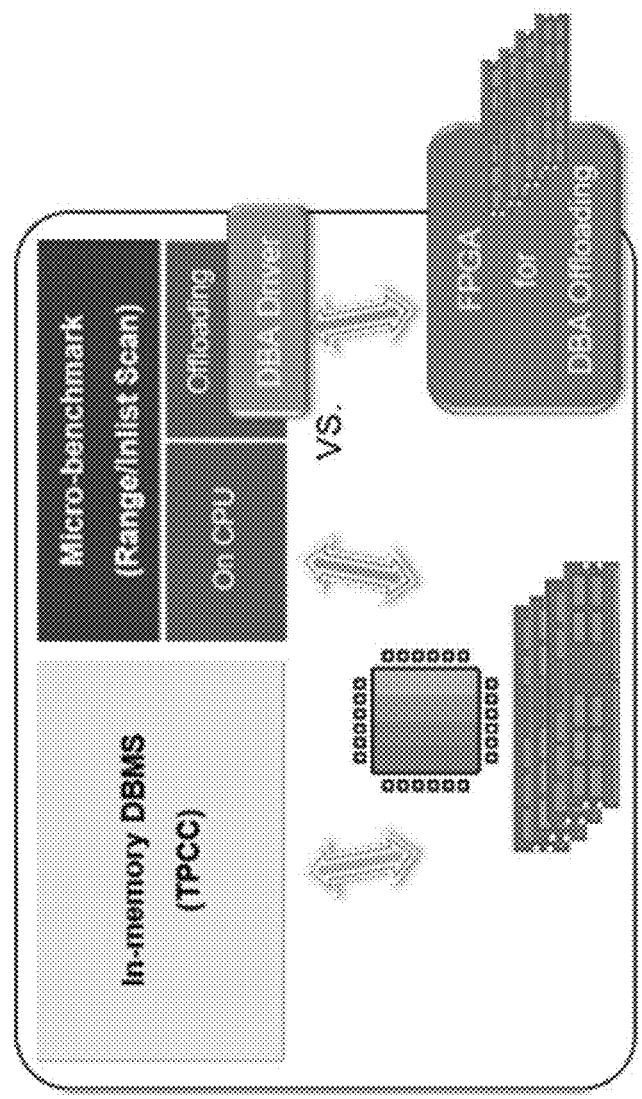
FIG. 29 is a system diagram of a system setup for evaluation of the technologies.

A system setup for evaluation has the embedded Transaction Processing Performance Council Benchmark C (TPCC) benchmark in an in-memory database management system and a separate micro-benchmark program to generate scan workloads in a single server as shown in FIG. 29.

In the example, one can use the TPCC benchmark for online transactional processing workload. Its generator is embedded within the in-memory database management system engine to remove the communication and session management overhead because the total throughput is usually bound by the session layer, not the in-memory database management system engine. For benchmarking, one can try to keep the TPCC consuming as much CPU resources as possible.

The micro-benchmark performs the scan workloads on the CPU or via FPGA. Its data is randomly generated and bit compressed. The separate data for scans avoids the internal overhead of in-memory database management system like locking by two different workloads and enables one to focus on the performance effect by hardware resources. In the example, scans read 2 billion bit-compressed integer values and return the row IDs satisfying the filter conditions. When it runs on CPU, the same number of scan threads are bound to each socket to prevent the workload skewed among the sockets on the 4-socket server (Intel Xeon Gold 6140@2.30 GHz, 18 cores and 6*64 GB memories per socket). For database accelerator offloading, one can attach one Ultrascale+ FPGA@250 MHz per socket and put 6 scan engines with 4*64 GB DDR4 DIMMs @1866 MHz per FPGA. The scan data is copied to the memory in each FPGA to emulate that DBA offloading runs within memory devices where the data resides. One can compare the performance variation of TPCC workloads and measure the latency and throughput scalability of scan workloads in both options (on CPU vs. on FPGA), while the number of scan threads increases.

Example 44

Evaluation: Results

Proof of concept results of the database accelerator results can be compared with a state-of-art 4-socket Skylake system having 72 physical cores.

Figure 30:
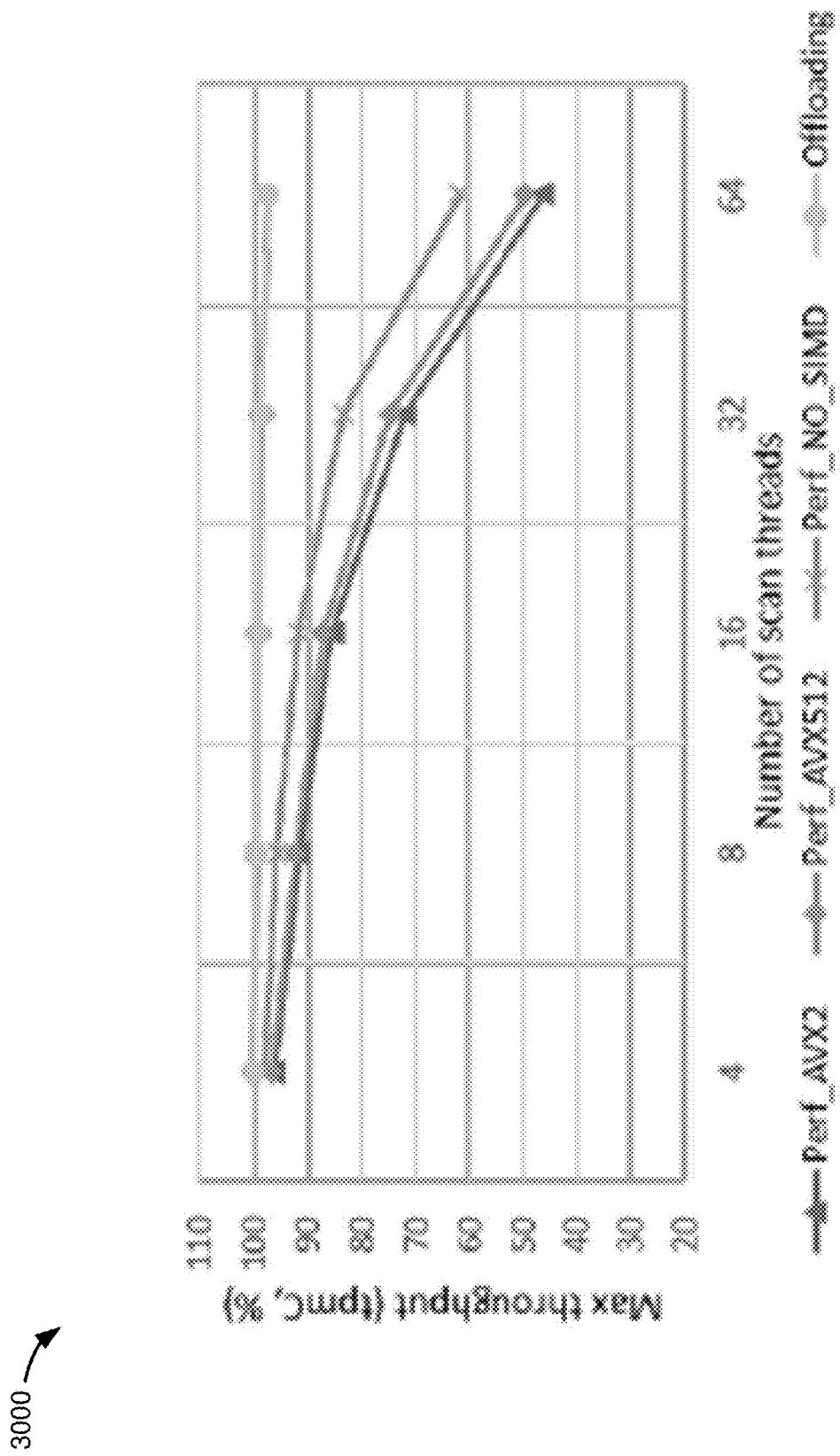
FIG. 30 is a graph showing online transaction processing throughout gain by database acceleration.

FIG. 30 demonstrates the system performance gain of an in-memory database management system. While TPCC workload runs in the server, scan micro-benchmark runs on either CPU or database accelerator with a different number of threads. As a result, database accelerator offloading shows less performance slowdown as the number of scan threads increases. Therefore, database accelerator offloading shows 115% better tpmC (transactions per minute) in TPCC workloads when all 64 scan threads are offloaded than when 64 threads use AVX2 on CPU. The results confirm that database accelerator offloading can alleviate CPU conflict, cache thrashing and memory bandwidth conflict by data-intensive operations.

|  | On CPU | | | |
| --- | --- | --- | --- | --- |
|  | NO_SIMD | AVX2 | AVX512 | Offloading |
| Latency of single scan (sec/scan) | 4.16 | 0.44 | 0.47 | 0.29 |

Database accelerator offloading shows better performance in scan operation itself, when scans run without online transaction processing workloads. Database accelerator offloading shows 1.5× better latency (sec/scan) than AVX2 and 14.3× better than NO-SIMD as shown in Table 2.

Figure 31:
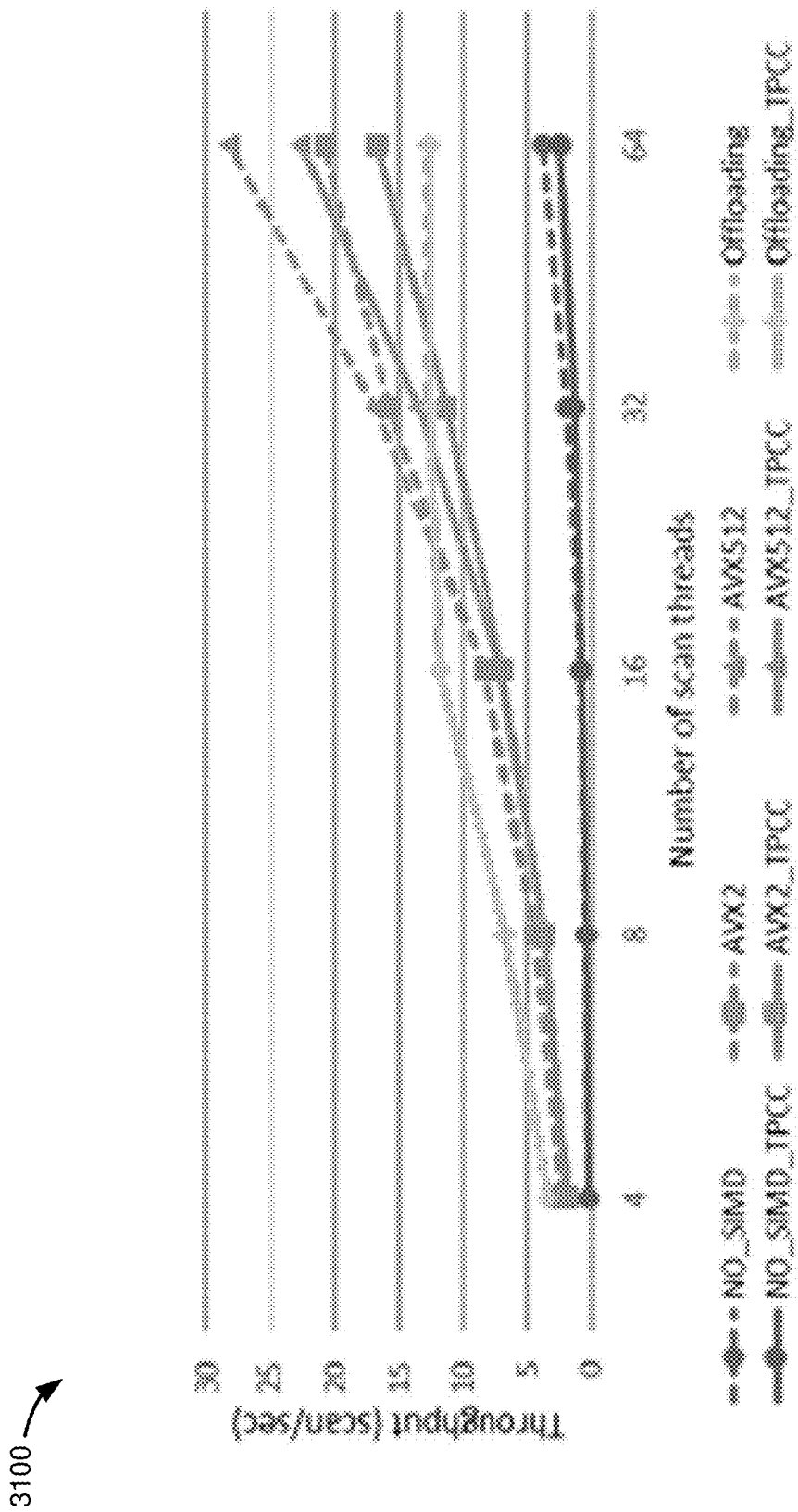
FIG. 31 is a graph showing scan throughput with/without TPCC.

As for the throughput (scans/sec) scalability, database accelerator offloading shows quite promising performance as shown in FIG. 31. The solid lines represent the throughputs of scans when TPCC workloads are executed concurrently. The dotted lines represent scan throughput without TPCC workloads. Database accelerator offloading shows similar performance regardless of the presence of TPCC workloads, while scanning with SIMD/NO-SIMD shows a significant performance drop because of the interference from TPCC workloads. Database accelerator offloading outperforms scanning with SIMD/NOSIMD up to 16 threads and shows similar performance to SIMD scan with 32 threads. In the evaluation implementation, each database accelerator FPGA has 6 scan engines and 4 DIMM slots. The results show the throughput by DBA offloading is saturated with 16 threads (4 threads per FPGA) because of the limited memory bandwidth of 4 memory channels and resources within FPGA. Each CPU has 6 DDR channels with 128 GB/sec bandwidth while each FPGA has 4 with 60 GB/sec. When the database accelerator has the same number of threads, it performs better than a CPU running with SIMD. In an SoC (System on Chip) implementation where database accelerator offloading is embedded in real memory devices, these limitations will be relieved, and the overall performance will be improved further by higher clock frequency or more database accelerator engines.

In the example, one has similar performance gain with both range and inlist scans, and similar results regardless of bit-cases used in bit-packed compression.

Example 45

Example Memory Devices and Accessibility

Although some examples involve DRAM-DIMMs, and the data on the DRAMs is accessed by the central processing unit via memory mapped I/O, the features described herein can be implemented on any memory device and can be accessed via a DDR protocol in general or by interfaces such as CXL, Gen-Z, and the like.

So, the database accelerator engines can be implemented on a memory device. Such a memory device can be byte-addressable by the central processing unit, and communication between the memory devices and the central processing unit can be accomplished via a general protocol such as DDR (e.g., DDR4, DDR5, or the like) or other protocols such as CXL, Gen-Z, or the like.

Thus, results can be retrieved via a byte-addressable technique.

The features can also be implemented via memory mapped I/O via PCIe-connected memory devices.

Device memory can comprise one memory device or a plurality of memory devices.

Example 46

Example Optimization

Although the terms "optimize" or "optimization" are used herein, such terms do not mean necessarily finding the best possible solution. Instead, optimization can take the form of an improved solution (e.g., a solution that is better than another solution). In some cases, so-called "optimized" movement of data can involve no movement at all (e.g., processing source data in place).

Example 47

Further Description of Evaluation

This described evaluation was done using DIMM-attached FPGAs. The host system accesses the device memory through PCIe MMIO (Memory Mapped I/O) by mapping the device memory in the same address space of the host memory. Even with the slow performance of MMIO in PCIe, the offloading performance is not affected, because implemented offloading only accesses the local device memory on FPGA once offloading operation starts.

Database accelerator offloading can be implemented on diverse memory form-factors with their own pros and cons. DIMM-based memory is quite common and very fast, but the memory controller will naturally interleave the data among memory channels. Therefore, even a single value can be crossed on two DIMMs and database accelerator driver can handle the data interleaving while processing offloaded operations.

Other possible interfaces like CXL (Compute Express Link), Gen-Z and OpenCAPI will enable a new memory pool hosting the columnar main storage in IMDBMS. Although these interfaces introduce a bit higher latency than DIMM, the memory devices are not part of host memory controller pool where data are typically interleaved at 64B granularity. This allows the database accelerator to assume a contiguous data layout in its attached memory and operates without considering data interleaving across memory channels. Non-contiguity in the physical address space of the contiguous data in the virtual address space can exist. Database accelerator offloading can provide so-called 'scatter and gather' feature by building a page translation table.

In a cloud landscape, the micro-services of an in-memory database management system can be spread out among several nodes (servers) according to its role like computing or storage. The computing nodes to process the transactions (or queries) in the front side may be easily scaled out to handle more workloads, but the storage node cannot be simply scaled out. Database accelerator offloading can contribute to resolving such a situation in the cloud.

Example 48

Example Advantages

Possible advantages of the described offloading technologies include improved overall performance when performing database operations on an in-memory database.

In the absence of database accelerators, a memory wall can form between a processor and DRAM, leading to slow latency, less bandwidth, and more power consumption. In-memory databases can involve a huge amount of data access, resulting in an increased memory bottleneck, leading to more cache thrashing, memory bound conditions (CPU halts) while transferring data, and the like.

Figure 32:
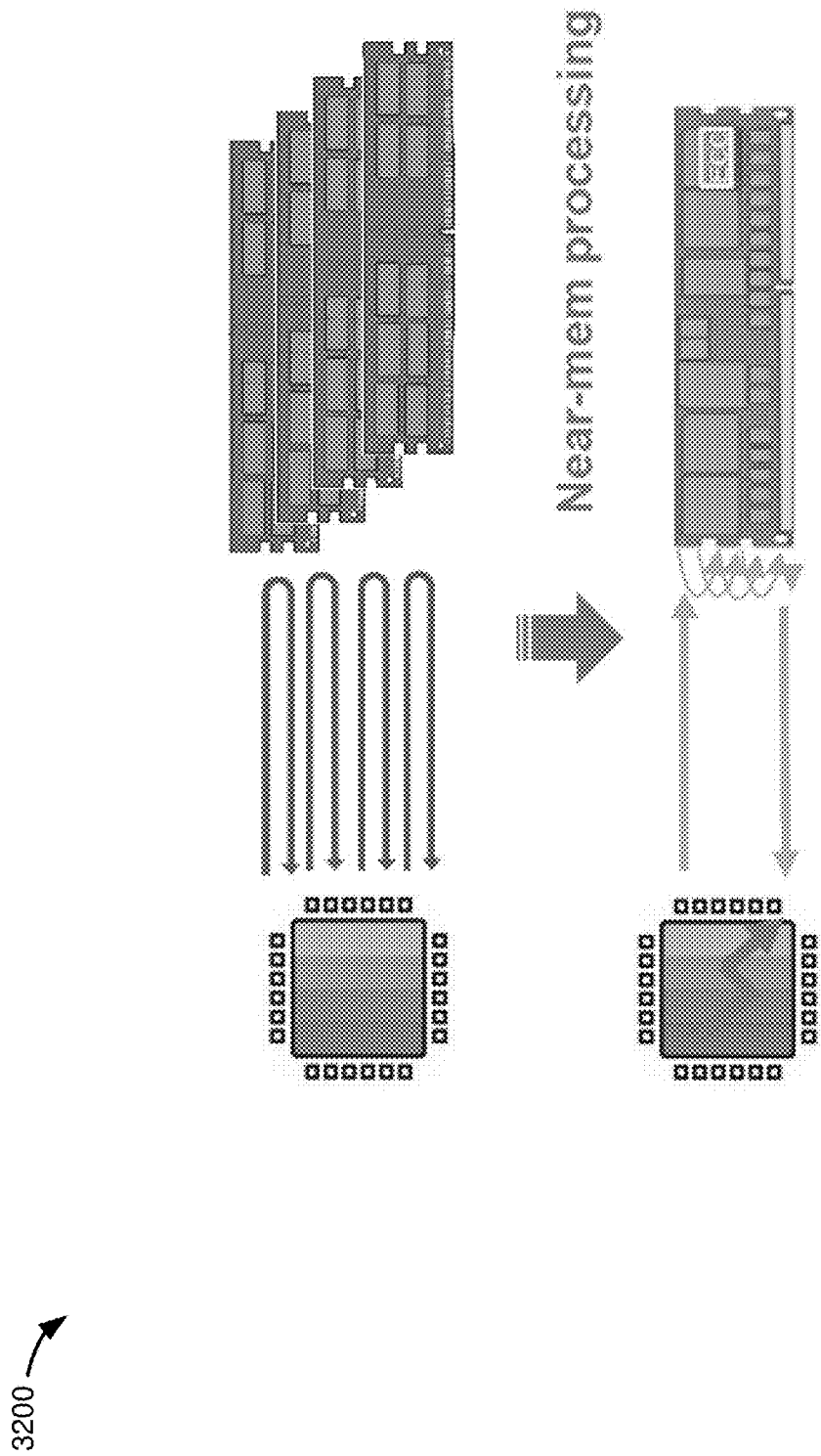
FIG. 32 is a block diagram showing general database accelerator advantages.

As described herein, database operations that are expensive in terms of memory accesses in an in-memory database environment can be offloaded to where the data resides (e.g., memory devices) using near-memory processing. Although a scan (e.g., rang/in-list search), and lookup (e.g., batch retrieval with a range of rows for aggregation) were used in the proof-of-concept, the advantages can result from any database operation. The result is less CPU usage, fewer cache misses, and fewer memory bound conditions. The general effect is shown in FIG. 32. The CPU-to-memory data path is freed for processing other than the offloaded database operation(s).

In any of the examples herein, the technologies can be implemented in in-memory database management systems, such as HANA of SAP SE of Walldorf, Germany or other in-memory systems. A driver can be put into place to handle a variety of hardware implementations while maintaining an abstraction layer (e.g., Application Programming Interface) that allows applications to take advantage of the DBA in a predictable, uniform way, regardless of the underlying hardware implementation.

Although range and inlist database operations are shown in the examples, other database operations can be implemented. Any such database operations can be offloaded to the DBA via offloading API functions.

Observation shows that OLTP-like mission critical workloads can be interfered with by data-intensive operations like massive scans. A near-memory database accelerator (DBA) can improve (e.g., avoid) data movement, and performing the expensive scan operations in the memory devices can alleviate CPU load, cache conflict, and host memory bandwidth bottleneck. To confirm its feasibility, an example offloading system was implemented using FPGAs with attached DIMMs. Its results show more than 2× performance gain in OLTP workload when offloading the data-intensive operations, and higher or similar throughput scalability with better latency in offloaded scan workloads.

Aggregation is another data-intensive operation in IMDBMS consuming about 20-50% of CPU usage depending on the workloads. It reads huge data but most of them are not reused in the next processing steps. DBA offloading on aggregation is being investigated as the next target operation.

In any of the examples herein, operations can be performed on the source data in situ (in place, while the data resides in memory) by hardware associated with or integrated with the hardware storing the source data.

Example 49

Example Computing Systems

Figure 33:
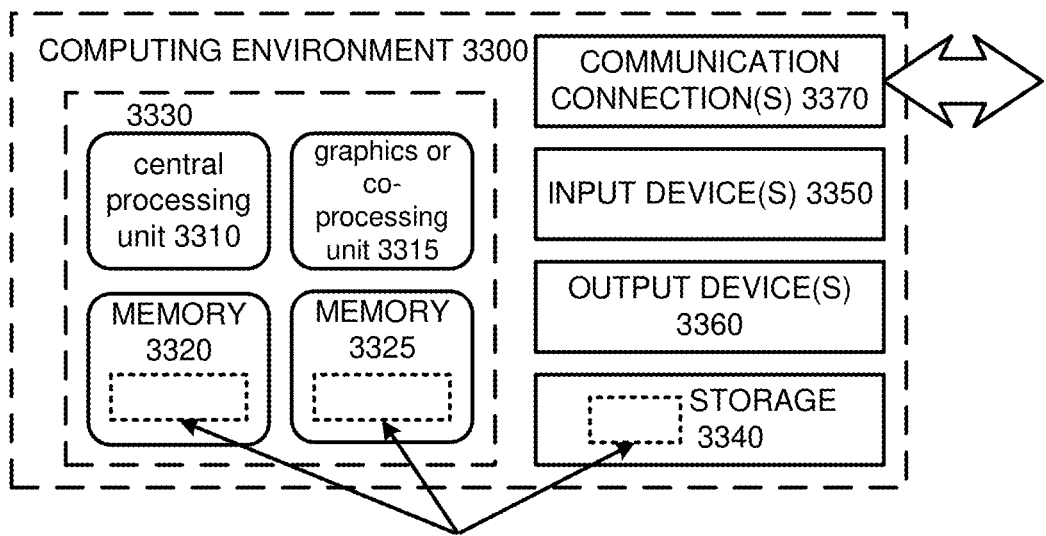
FIG. 33 is a block diagram of an example computing system in which described embodiments can be implemented.

FIG. 33 depicts an example of a suitable computing system 3300 in which the described innovations can be implemented. The computing system 3300 is not intended to suggest any limitation as to scope of use or functionality of the present disclosure, as the innovations can be implemented in diverse computing systems.

With reference to FIG. 33, the computing system 3300 includes one or more processing units 3310, 3315 and memory 3320, 3325. In FIG. 33, this basic configuration 3330 is included within a dashed line. The processing units 3310, 3315 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 33 shows a central processing unit 3310 as well as a graphics processing unit or co-processing unit 3315. The tangible memory 3320, 3325 can be volatile memory (e.g., registers, cache, RAM), non-volatile memory (e.g., ROM, EEPROM, flash memory, etc.), or some combination of the two, accessible by the processing unit(s) 3310, 3315. The memory 3320, 3325 stores software 3380 implementing one or more innovations described herein, in the form of computer-executable instructions suitable for execution by the processing unit(s) 3310, 3315.

In any of the examples described herein, specialized memory hardware can be included to implement the DBA functionality.

A computing system 3300 can have additional features. For example, the computing system 3300 includes storage 3340, one or more input devices 3350, one or more output devices 3360, and one or more communication connections 3370, including input devices, output devices, and communication connections for interacting with a user. An interconnection mechanism (not shown) such as a bus, controller, or network interconnects the components of the computing system 3300. Typically, operating system software (not shown) provides an operating environment for other software executing in the computing system 3300, and coordinates activities of the components of the computing system 3300.

The tangible storage 3340 can be removable or non-removable, and includes magnetic disks, magnetic tapes or cassettes, CD-ROMs, DVDs, or any other medium which can be used to store information in a non-transitory way and which can be accessed within the computing system 3300. The storage 3340 stores instructions for the software 3380 implementing one or more innovations described herein.

The input device(s) 3350 can be an input device such as a keyboard, mouse, pen, or trackball, a voice input device, a scanning device, touch device (e.g., touchpad, display, or the like) or another device that provides input to the computing system 3300. The output device(s) 3360 can be a display, printer, speaker, CD-writer, or another device that provides output from the computing system 3300.

The communication connection(s) 3370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 50

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 51

Example Cloud Computing Environment

Figure 34:
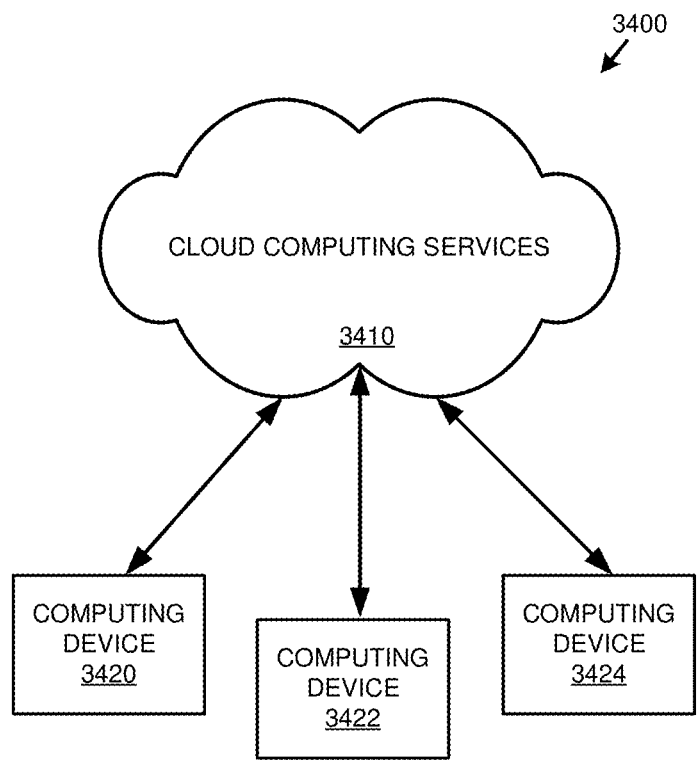
FIG. 34 is a block diagram of an example cloud computing environment that can be used in conjunction with the technologies described herein.

FIG. 34 depicts an example cloud computing environment 3400 in which the described technologies can be implemented. The cloud computing environment 3400 comprises cloud computing services 3410. The cloud computing services 3410 can comprise various types of cloud computing resources, such as computer servers, data storage repositories, networking resources, etc. The cloud computing services 3410 can be centrally located (e.g., provided by a data center of a business or organization) or distributed (e.g., provided by various computing resources located at different locations, such as different data centers and/or located in different cities or countries).

The cloud computing services 3410 are utilized by various types of computing devices (e.g., client computing devices), such as computing devices 3420, 3422, and 3424. For example, the computing devices (e.g., 3420, 3422, and 3424) can be computers (e.g., desktop or laptop computers), mobile devices (e.g., tablet computers or smart phones), or other types of computing devices. For example, the computing devices (e.g., 3420, 3422, and 3424) can utilize the cloud computing services 3410 to perform computing operations (e.g., data processing, data storage, and the like).

In practice, cloud-based, on-premises-based, or hybrid scenarios can be supported.

Example 52

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 53

Further Examples

Any of the following Clauses can be implemented:
Clause 1. A system comprising:
in an in-memory database management system environment comprising source data stored in device memory, a plurality of database accelerator engines configured to directly perform database operations on the source data in situ.
Clause 2. The system of Clause 1 wherein:
the database accelerator engines comprise executable database accelerator engines that execute on near-memory processors.
Clause 3. The system of any one of Clauses 1-2 wherein:
the database accelerator engines are operable to receive a request from a central processing unit;
the database accelerator engines are executed by hardware outside of the central processing unit; and
the request specifies the database operations.
Clause 4. The system of Clause 1 wherein:
the database accelerator engines execute on near-memory processors separate from the central processing unit.
Clause 5. The system of any one of Clauses 1-4 wherein:
the central processing unit retrieves results of the database operations computed by the database accelerator engines via a byte-addressable technique.
Clause 6. The system of any one of Clauses 1-5 wherein:
the central processing unit retrieves results of the database operations computed by the database accelerator engines via a DDR protocol.
Clause 7. The system of any one of Clauses 1-6 wherein:
the central processing unit retrieves results of the database operations computed by the database accelerator engines via memory mapped I/O.
Clause 8. The system of any one of Clauses 1-7 wherein:
the database accelerator engines are operable to receive a request from a central processing unit;
the database accelerator engines are executed by hardware accessing the source data separately from the central processing unit; and
the request specifies the database operations.
Clause 9. The system of any one of Clauses 1-8 wherein:
the database accelerator engines are operable to receive a request from a central processing unit;
the database accelerator engines are implemented by near-memory hardware accessing the source data separately from the central processing unit; and
the request specifies the database operations.
Clause 10. A method comprising:
in an in-memory database management system environment, receiving a request to perform a series of database operations on a plurality of values represented in source data stored in device memory; and
performing the series of database operations in situ in the device memory.
Clause 11. The method of Clause 10 wherein:
the request is received from a central processing unit offloading the series of database operations to a plurality of database accelerator engines.
Clause 12. The method of any one of Clauses 10-11 further comprising:
retrieving results of the series of database operations to a central processing unit via memory mapped I/O.

39

Clause 13. A system comprising:
in an in-memory database management system environment comprising source data stored in device memory, a plurality of database accelerator engines configured to directly perform database operations on the source data in situ; and
a processor configured to offload database operations to the database accelerator engines and retrieve results therefrom.
Clause 14. The system of Clause 8 further comprising:
a hardware processor configured to offload database operations to the database accelerator engines and retrieve results therefrom.
Clause 15. A method substantially as shown and described.
Clause 16. A system substantially as shown and described.

Example 54

Other Further Examples

Any of the following Clauses can be implemented:
Clause 1. A method comprising:
in an in-memory database management system environment, receiving a request to perform a database operation on a plurality of values represented in source data, wherein the source data is stored in device memory of a near-memory database accelerator;
offloading the database operation to the near-memory database accelerator; and
receiving, from the near-memory database accelerator, an indication that results of the database operation are available.
Clause 2. The method of claim 1 wherein:
the plurality of values represented in source data are stored in compressed form in a main store of an in-memory database management system.
Clause 3. The method of any one of Clauses 1-2 further comprising:
before receiving the request, storing the source data in the device memory of the near-memory database accelerator as specified by in-memory database management system configuration information.
Clause 4. The method of any one of Clauses 1-3 wherein:
the request is received from an in-memory database management system via an application programming interface (API) for a scan database operation.
Clause 5. The method of any one of Clauses 1-4 wherein:
the request is received from an in-memory database management system as a result of determining, within the in-memory database management system, that the database operation of the request is to be offloaded.
Clause 6. The method of any one of Clauses 1-5 wherein:
the source data comprises an in-memory database component stored in the device memory of the near-memory database accelerator; and
the near-memory database accelerator performs the database operation on the in-memory database component stored in device memory of the near-memory database accelerator.
Clause 7. The method of claim 6 wherein:
the source data is compressed; and
the request comprises compression information of the source data that is used by the near-memory database accelerator for decompression of the source data.

40

Clause 8. The method of claim 7 wherein:
the source data is compressed according to a bit-packed compression format, and the compression information specifies a number-of-bits for the bit-packed compression format.
Clause 9. The method of any one of Clauses 1-8 wherein:
the near-memory database accelerator comprises a database accelerator engine co-resident with device memory and configured to execute the database operation; and
the device memory is separate from a central processing node.
Clause 10. The method of any one of Clauses 1-9 wherein:
the request is received at a central processing unit;
the device memory is directly accessible by the central processing unit; and
the near-memory database accelerator comprises a database accelerator engine separate from the central processing unit, wherein the database accelerator engine is configured to execute the database operation.
Clause 11. The method of claim 10 wherein:
the offloading relieves a central-processing-unit-to memory data path for processing other than the database operation.
Clause 12. The method of any one of Clauses 1-11 wherein:
the source data comprises database table values in column format;
the database operation comprises a table scan for a specified predicate; and
the results indicate for which database column values the specified predicate is valid.
Clause 13. The method of any one of Clauses 1-12 wherein:
the request is received from an in-memory database application by a near-memory database accelerator driver that interacts with the near-memory database accelerator on behalf of the in-memory database application.
Clause 14. The method of any one of Clauses 1-13 wherein:
the database operations are performed in situ in the device memory by the near-memory database accelerator.
Clause 15. The method of any one of Clauses 1-14 further comprises:
retrieving the results from the device memory to a central processing unit, wherein the retrieving bypasses the database accelerator.
Clause 16. The method of any one of Clauses 1-15 wherein the request comprises a capacity parameter specifying size of an output buffer, and the method further comprises:
detecting, in the near-memory database accelerator, based on the capacity parameter that the output buffer is not of sufficient size to hold the results; and
responsive to detecting that the output buffer is not of sufficient size, returning a result of partial completion.
Clause 17. A system comprising:
one or more processing units;
main memory or extended memory directly accessible by the one or more processing units; and
a near-memory database accelerator driver configured to receive a request to perform a database operation on source data stored in device memory of a near-memory database accelerator comprising at least one database accelerator engine separate from the one or more processing units, offload the database operation to the near-memory database accelerator for execution by the at least one database accelerator engine separate from the one or more processing units, and receive an indication from the near-memory database accelerator that results of the database operation are available;

wherein the main memory or extended memory comprises the device memory of the near-memory database accelerator.

Clause 18. The system of claim 17 wherein:

the near-memory database accelerator driver is configured to return a partial completion result if the results are too large for an output buffer capacity specified in the request.

Clause 19. The system of any one of Clauses 17-18 wherein:

the one or more processing units retrieve results of the database operations computed by the at least one database accelerator engine via memory mapped I/O.

Clause 20. One or more computer-readable media comprising computer-executable instructions that when executed cause a computing system to perform a method comprising:

receiving, from an in-memory database management system, an application programming interface (API) call requesting that a database operation be offloaded to a near-memory database accelerator, wherein the database operation is performed on an in-memory column of a database table that is compressed according to bit-packed compression format, and the API call specifies a number-of-bits parameter;

responsive to the API call, sending a request to a near-memory database accelerator, wherein the sending comprises relaying the number-of-bits parameter and the near-memory database accelerator performs the database operation with the number-of-bits parameter;

receiving an indication from the near-memory database accelerator that the database operation has completed; and notifying the in-memory database management system that the database operation has completed.

Clause 21. One or more computer-readable media comprising computer-executable instructions that when executed cause a computing system to perform the method of any one of Clauses 1-16.

Example 55

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

We claim:

1. A method comprising:

in an in-memory database management system environment, at a database accelerator driver, receiving a request from an application to perform a database operation on a plurality of values represented in source data, wherein the source data is stored in device memory of a near-memory database accelerator, wherein the driver interacts with the near-memory database accelerator on behalf of the application, wherein the source data is specified to the driver as a virtual address, and the driver chooses hardware that has the source data based on the virtual address;

by the database accelerator driver, offloading the database operation to the near-memory database accelerator; and by the database accelerator driver, receiving, from the near-memory database accelerator, an indication that results of the database operation are available; and relaying the indication that results of the database operation are available to the application for retrieval by the application directly, thereby bypassing the near-memory database accelerator.

2. The method of claim 1 wherein:

the plurality of values represented in source data are stored in compressed form in a main store of an in-memory database management system.

3. The method of claim 1 further comprising:

before receiving the request, storing the source data in the device memory of the near-memory database accelerator as specified by in-memory database management system configuration information.

4. The method of claim 1 wherein:

the request is received from an in-memory database management system via an application programming interface (API) for a scan database operation.

5. The method of claim 1 wherein:

the request is received from an in-memory database management system as a result of determining, within the in-memory database management system, that the database operation of the request is to be offloaded.

6. The method of claim 1 wherein:

the source data comprises an in-memory database component stored in the device memory of the near-memory database accelerator; and the near-memory database accelerator performs the database operation on the in-memory database component stored in device memory of the near-memory database accelerator.

7. The method of claim 6 wherein:

the source data is compressed; and the request comprises compression information of the source data that is used by the near-memory database accelerator for decompression of the source data.

8. The method of claim 7 wherein:

the source data is compressed according to a bit-packed compression format, and the compression information specifies a number-of-bits for the bit-packed compression format.

9. The method of claim 1 wherein:

the near-memory database accelerator comprises a database accelerator engine co-resident with device memory and configured to execute the database operation; and the device memory is separate from a central processing node.

10. The method of claim 1 wherein:

the request is received at a central processing unit;

the device memory is directly accessible by the central processing unit; and the near-memory database accelerator comprises a database accelerator engine separate from the central processing unit, wherein the database accelerator engine is configured to execute the database operation.

11. The method of claim 10 wherein:
the offloading relieves a central-processing-unit-to memory data path for processing other than the database operation.

12. The method of claim 1 wherein:
the source data comprises database table values in column format;
the database operation comprises a table scan for a specified predicate; and
the results indicate for which database column values the specified predicate is valid.

13. The method of claim 1 wherein:
the request is received from an in-memory database application by a near-memory database accelerator driver that interacts with the near-memory database accelerator on behalf of the in-memory database application.

14. The method of claim 1 wherein:
the database operations are performed in situ in the device memory by the near-memory database accelerator.

15. The method of claim 1 further comprises:
retrieving the results from the device memory to a central processing unit, wherein the retrieving bypasses the database accelerator.

16. The method of claim 1 wherein the request comprises a capacity parameter specifying size of an output buffer, and the method further comprises:
detecting, in the near-memory database accelerator, based on the capacity parameter that the output buffer is not of sufficient size to hold the results; and
responsive to detecting that the output buffer is not of sufficient size, returning a result of partial completion.

17. A system comprising:
one or more processing units;
main memory or extended memory directly accessible by the one or more processing units; and
a near-memory database accelerator driver configured to receive a request from an application to perform a database operation on source data stored in device memory of a near-memory database accelerator comprising at least one database accelerator engine separate from the one or more processing units, offload the database operation to the near-memory database accelerator for execution by the at least one database accelerator engine separate from the one or more processing units, wherein the source data is specified to the near-memory database accelerator driver as a virtual address, and the near-memory database accelerator driver chooses hardware that has the source data based on the virtual address, receive an indication from the near-memory database accelerator that results of the database operation are available, and relay the indication that results of the database operation are available to the application for retrieval by the application directly, thereby bypassing the near-memory database accelerator;
wherein the main memory or extended memory comprises the device memory of the near-memory database accelerator.

18. The system of claim 17 wherein:
the near-memory database accelerator driver is configured to return a partial completion result if the results are too large for an output buffer capacity specified in the request.

19. The system of claim 17 wherein:
the one or more processing units retrieve results of the database operations computed by the at least one database accelerator engine via memory mapped I/O.

20. One or more computer-readable media comprising computer-executable instructions that when executed cause a computing system to perform a method comprising:
in an in-memory database management system environment, at a database accelerator driver, receiving a request from an application to perform a database operation on a plurality of values represented in source data, wherein the source data is stored in device memory of a near-memory database accelerator, wherein the driver interacts with the near-memory database accelerator on behalf of the application, and wherein the source data is specified to the driver as a virtual address;
by the database accelerator driver, offloading the database operation to the near-memory database accelerator; and
by the database accelerator driver, receiving, from the near-memory database accelerator, an indication that results of the database operation are available; and
relaying the indication that results of the database operation are available to the application.

* * * * *